(12) United States Patent
Harris et al.

(10) Patent No.: US 8,734,080 B2
(45) Date of Patent: *May 27, 2014

(54) CAR DUMPER DUST COLLECTION METHOD AND APPARATUS

(75) Inventors: Michael Harris, Ramsey, MN (US);
Dennis Hall, Minneapolis, MN (US);
Kal N. Ugargol, Minneapolis, MN (US)

(73) Assignee: Air-Cure Incorporated, Minneapolis, MN (US)

( * ) Notice: Subject to any disclaimer, the term of this patent is extended or adjusted under 35 U.S.C. 154(b) by 192 days.

This patent is subject to a terminal disclaimer.

(21) Appl. No.: 13/170,363

(22) Filed: Jun. 28, 2011

(65) Prior Publication Data

US 2011/0255942 A1     Oct. 20, 2011

Related U.S. Application Data

(63) Continuation of application No. 12/822,845, filed on Jun. 24, 2010, now Pat. No. 7,988,401, and a continuation of application No. 11/981,618, filed on Oct. 31, 2007, now Pat. No. 7,811,041, and a continuation of application No. 11/235,655, filed on Sep. 26, 2005, now Pat. No. 7,322,785, and a continuation-in-part of application No. 10/159,808, filed on May 31, 2002, now Pat. No. 6,960,054.

(60) Provisional application No. 60/294,809, filed on May 31, 2001.

(51) Int. Cl.
*B65G 67/50*     (2006.01)

(52) U.S. Cl.
USPC .......................... 414/291; 414/359; 414/371

(58) Field of Classification Search
USPC ......... 414/291, 359, 362, 363, 371, 576, 577, 414/581
See application file for complete search history.

(56) References Cited

U.S. PATENT DOCUMENTS

| | | | |
|---|---|---|---|
| 3,631,816 | A | 1/1972 | Miller |
| 3,646,728 | A | 3/1972 | Holler, Jr. |
| 3,841,234 | A | 10/1974 | Nicoletti |
| 4,141,299 | A | 2/1979 | Friend et al. |
| 4,240,355 | A | 12/1980 | Puariea |
| 4,360,369 | A | 11/1982 | Niederer |
| 4,389,149 | A | 6/1983 | Dancs |
| 4,407,202 | A | 10/1983 | McCormick |
| 4,479,749 | A | 10/1984 | Binzen |

(Continued)

OTHER PUBLICATIONS

U.S. Appl. No. 12/822,845, filed Jun. 24, 2010, Michael R. Harris et al.

(Continued)

*Primary Examiner* — James Keenan
(74) *Attorney, Agent, or Firm* — Patterson Thuente Pedersen, P.A.

(57) ABSTRACT

An apparatus for rotary dumping of rail cars, including a material receiving pit. A rotary rail car dumper includes a rotational frame supporting at least one baffle. The rotational frame is configured to dump a load from a rail car during rotational motion of the rotational frame between an upright position wherein the entire load is in the rail car and a dumping position wherein the load can exit the rail car. A backside airflow diverter is located beneath the rotational frame and includes a curved upper surface. A lower margin of the at least one baffle contacts the curved upper surface during at least part of the rotational motion of the rotational frame. A backside hood is located beneath the backside airflow diverter on the back side of the pit.

14 Claims, 29 Drawing Sheets

(56) References Cited

U.S. PATENT DOCUMENTS

| | | |
|---|---|---|
| 4,609,321 A | 9/1986 | Binzen |
| 4,662,126 A | 5/1987 | Malcolm |
| 4,699,187 A | 10/1987 | Binzen |
| 5,017,077 A | 5/1991 | Dowden |
| 5,049,007 A | 9/1991 | Abel |
| 5,140,911 A | 8/1992 | Holland |
| 5,279,629 A | 1/1994 | Stueble |
| 5,302,071 A | 4/1994 | Binzen |
| 5,560,887 A | 10/1996 | Roy et al. |
| 5,567,105 A | 10/1996 | Williams |
| 5,727,475 A | 3/1998 | Kurtz |
| 5,893,399 A | 4/1999 | Kearney |
| 6,089,378 A | 7/2000 | Mascheretti et al. |
| 6,192,804 B1 | 2/2001 | Snead |
| 6,960,054 B2 | 11/2005 | Hall et al. |
| 7,322,785 B2 | 1/2008 | Hall et al. |
| 7,811,041 B2 | 10/2010 | Hall et al. |
| 7,959,398 B2 | 6/2011 | Harris et al. |
| 7,988,401 B2 | 8/2011 | Harris et al. |

OTHER PUBLICATIONS

Air Cure Incorporated Brochure; entitled "Air Cure RF Dust Filter—Air pollution control/Low power/Simple operation", Bulletin RF-9; 8 pages.

Air Cure Incorporated Brochure; entitled "Dust Control Systems for coal handlers throughout the USA"; Bulletin CH-4, 6 pages.

U.S. Appl. No. 12/822,845, filed Jun. 24, 2010; Dennis Hall et al.
U.S. Appl. No. 11/981,618, filed Oct. 31, 2007; Dennis Hall et al.
U.S. Appl. No. 11/235,655, filed Sep. 26, 2005; Dennis Hall et al.
U.S. Appl. No. 10/159,808, filed May 31, 2002; Dennis Hall et al.

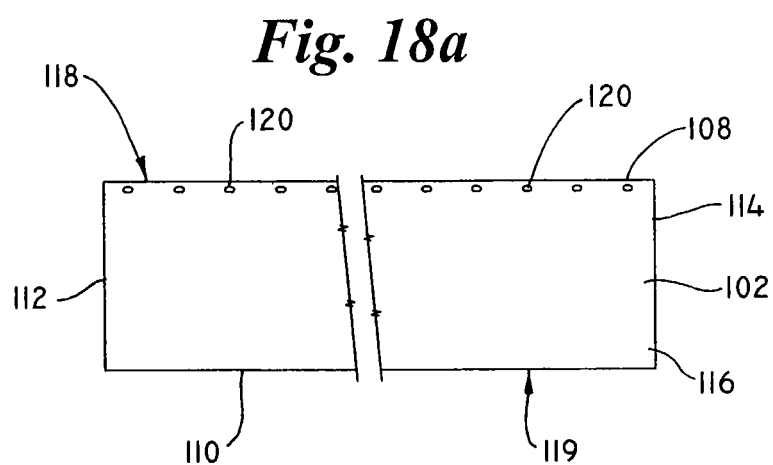
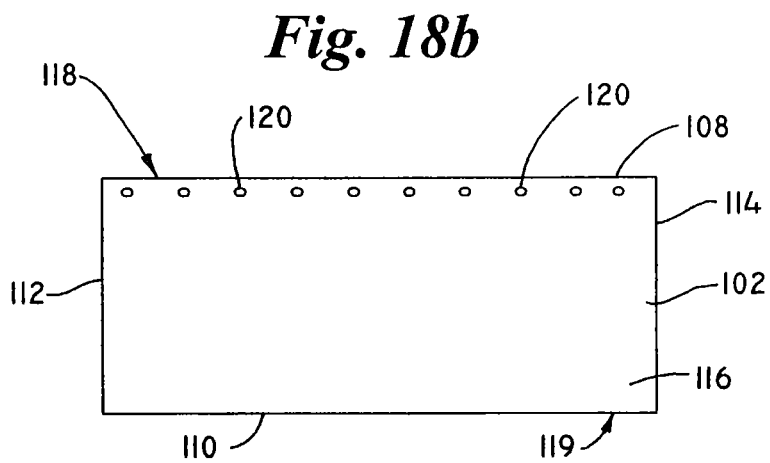

CAR DUMPER DUST COLLECTION METHOD AND APPARATUS

RELATED APPLICATIONS

This application is a continuation of application Ser. No. 12/822,845 filed Jun. 24, 2010 now U.S. Pat. No. 7,988,401, which is a continuation of application Ser. No. 11/981,618 filed Oct. 31, 2007 now U.S. Pat. No. 7,811,041, which is a continuation of application Ser. No. 11/235,655 filed Sep. 26, 2005 now U.S. Pat. No. 7,322,785, which is a continuation-in-part of application Ser. No. 10/159,808, filed May 31, 2002 now U.S. Pat. No. 6,960,054, which claims the benefit of U.S. Provisional Application No. 60/294,809 filed May 31, 2001 all of which are incorporated herein by reference in their entirety.

FIELD OF THE INVENTION

The present invention relates to rotary-dumping of material from rail cars, and more particularly, to a method and apparatus for controlling environmental contamination produced by rotary-dumping material from rail cars.

BACKGROUND OF THE INVENTION

Rail cars have been used for many years to efficiently haul large quantities of bulk materials over land. Items commonly shipped include grain, iron ore and coal. Shipping such items via rail car is very efficient due to the ability to transport extremely large loads of these materials in one shipment. For example, one single rail car may hold up to 110 tons of coal and an entire train made up of such cars may be over 130 cars in length, extending 6000 feet in total length.

Once at the destination, it is necessary to unload the cargo. For bulk material such as grain, ore, or coal, bottom-dumping and rotary-dumping are commonly used. Bottom-dumping involves staging a particular car over a receiving pit and opening hatches located in the bottom of the car. The cargo exits the car though the bottom hatches or doors and proceeds into the pit below. U.S. Pat. No. 5,302,071, assigned to Svedala Industries, Inc., discloses one example of a bottom-dumping rail car.

Bottom-dumping requires the use of rail cars that are specifically designed for bottom-dumping. This is due to the need to direct the car contents to a centrally located chute on the bottom of the car. The sides of the car must be at least partially sloped to urge the contents towards the chute, or else there would be a partial retention of the material being carried. This configuration decreases the ratio of the car's size vs. cargo capacity. Additionally, the bottom-dump configured rail cars are not easily interchangeable with standard cars at a dumpsite because the dump apparatus for standard cars must be uniquely configured to accommodate bottom-dump cars. The bottom-dump rail cars are also environmentally disadvantageous, as will be described more fully below.

Rotary-dumping is the other commonly used method of unloading a rail car. In rotary-dumping, a standard rectangular rail car is staged or indexed in a rotary-dump apparatus. The apparatus then rotates approximately one-half turn, thereby dumping the contents of the car into a receiving pit. Typically, the cars of the train remain connected during the dumping process through the use of rotary couplings between each car. Such couplings permit the cars to be rotated while still connected though an axis center at the coupling. U.S. Pat. Nos. 4,479,749 and 4,609,321, both assigned to Dravo Corporation, disclose conventional rotary-dump apparatuses. In some applications, such as the dumping of coal at major power plants, cars may be rotated and emptied at the rate of one car every four minutes.

Environmental pollution is an important concern to the design of a material dumping facility. When the car's load is dumped, a large quantity of material exits the car in a very short time. The turbulence generated by the quick unloading causes fine dust particles to billow up from the receiving pit and pollute the air surrounding the dump facility. The resulting dust, such as from grain or coal, is very explosive when in sufficient density. It is also an environmental pollutant. Therefore, there is a need to provide an apparatus and method for minimizing the polluting effect of dust.

Bottom-dump apparatuses have two critical drawbacks. First, they require special cars equipped with the bottom chutes as discussed previously. Second, the dust cloud produced by bottom-dumping is recognized by those skilled in the art to be larger, more aggressive and less controllable than the cloud produced by the rotary-dump method.

Rotary-dump systems control the dust cloud by using fans with large motors to exhaust the dust-filled air surrounding the car though conduits and into filtering devices. This process requires a very high flow of air and correspondingly very large motors to drive such high capacity system. These motors are commonly several hundred horsepower. Multiple motors of this size may be required at any given installation.

The cloud is typically large enough and aggressive enough to overpower any given removal system. Therefore, the airflow around the car and in the pit is controllably designed to keep the dust cloud suppressed long enough to allow the dust collection system to suck the dust from the surrounding area. The better the airflow is managed, the less horsepower is needed to drive the system. This results in greatly improved efficiency.

The Dravo patents listed above disclose a method of enclosing a rail car within a fixed enclosure. This design has several drawbacks. First, it restricts the operator's ability to observe the load as it is being dumped to ensure that the system does not malfunction and that no impurities or foreign objects are introduced into the pit. Next, the fixed enclosure requires multiple large motors to drive the plurality of air handling units. The filtering portions of the air handling units are within the dumping facility, which makes cleaning and maintenance more difficult. The presence of the air filtering units in the dumping facility exposes the facility to the risk of damage due to the force of explosions that sometimes occur in the filtering assemblies. Finally the efficiency of the system is low due to the large motors required to produce sufficient air removal capacity because the control of the airflow around the car does not have good dust cloud retention time.

There are two different types of rotary car dumpers in common use. Those skilled in the art refer to the two types of dumpers as rings out dumpers and rings in dumpers. The rings referred to are the structural ends of a car dumper which support the entire car dumper barrel and the railcar itself. Depending upon the design of a rotary car dumper it may have the rings located at the far ends of the dumper barrel, a rings out design, or it may have the rings located approximately one quarter of the length of the barrel in from the ends, the rings in design.

When a railroad car is dumped more air is displaced by the rush of product exiting the railcar than can be evacuated by a blower system in a period of time during the dump. Thus, there is a tendency for the moving dust laden air to escape from the car dumper pit by any exit path that may be available.

In the case of a rings out car dumper the dust laden air tends to escape beneath the end ring and travel upward between the end ring and the dumper pit wall. Thus, the dump creates an upward escaping cloud of dust laden air above track level. For reasons of air quality and environmental protection it is desirable to maintain the dust laden air beneath the track level within the dump pit area. Dust laden air that is above track level is harder to control and direct to a blower system for transport to a dust filter house.

In the case of a rings in car dumper, the dumper pit is often design with a portion of the dumper pit wall extending under the center line of the track. This wall extension is in place to support the trunions that, in turn support the supporting rings and thus the dumper barrel and dumper platen. This wall extension beneath the dumper barrel prevents dumper mounted baffles from extending to the extreme ends of the dumper pit because the dumper mounted baffles would interfere with the protruding wall while rotating. This arrangement creates a gap between the dumper pit wall and the baffles that is equal to the thickness of the wall extension that supports the dumper barrel.

Therefore, there is a continuing need to provide a rotary-dumper dust collection apparatus and system that overcomes the drawbacks of the prior art.

SUMMARY OF THE INVENTION

The present invention addresses the disadvantages in the prior art and the need to provide an environmentally friendly and efficient way to unload rail cars by providing a method and apparatus for controlling dust generated by the rotary dumping of rail cars. One or more flexible baffles are provided to the back-side of a rotary dump frame to seal a portion of the material receiving pit during a portion of the rotary motion. The dust cloud generated by this dumping is retained in the pit for an increased time due to tumbling of the cloud induced by the baffles and other features of the facility. A plurality of intake ducts removes the dust cloud from the pit for transfer to a remote filtering facility.

In a rings out dumper to prevent air from escaping beneath the end ring and traveling upward between the end ring and the dumper pit wall, the present invention includes an end ring baffle that protrudes from the grizzly to above the perimeter of the dumper end ring. The end ring baffle seals to the ski jump of the backside hood and extends toward the opposite side of the dump pit, sufficiently to prevent any airflow from escaping beneath the end ring. Thus, the end ring baffle extends from the backside hood toward the dump side of the pit. The precise length of the end ring baffle is determined by the dumper and pit design. The end ring baffle is fit to the grizzly which forms the reticulated top of the dumper pit hopper so that any air from the hopper is channeled upward past the perimeter of the end ring so that is unable to escape beneath the end ring.

In the case of the rings in dumper, the present invention includes an end of hood close off panel. The end of hood close off panel extends from the barrel support wall to the ski jump of the backside hood. Thus, the end of hood close off panel creates a barrier to prevent dust laden air from escaping the dust containment area. As moveable baffles suspended from the dumper drum rotate around they first make contact with the platen support wall and then engage the end of hood close off panel as they leave the wall. This creates a continuous seal for the remainder of the rotation of the dumper which prevents dust laden air from escaping around the end of the baffle.

BRIEF DESCRIPTION OF THE DRAWINGS

FIG. 18a is a side elevational view of a baffle for a rotary-dump apparatus according to an embodiment of the present invention;

FIG. 18b is a side elevational view of a baffle for a rotary-dump apparatus according to an embodiment of the present invention;

DETAILED DESCRIPTION OF THE INVENTION

Figure 1:
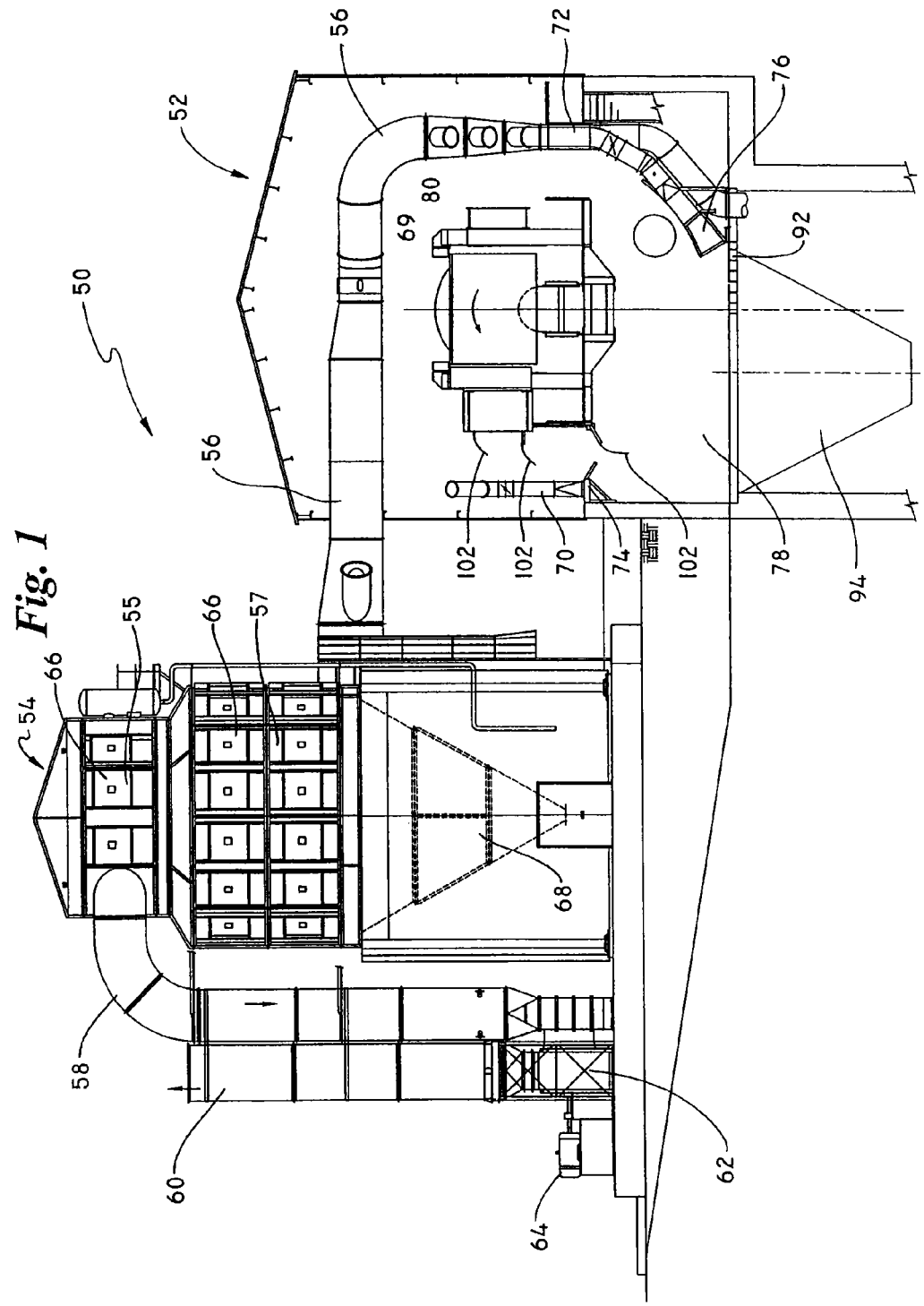
FIG. 1 is a side detail view of a rotary-dump facility according to an embodiment of the present invention.
Figure 2:
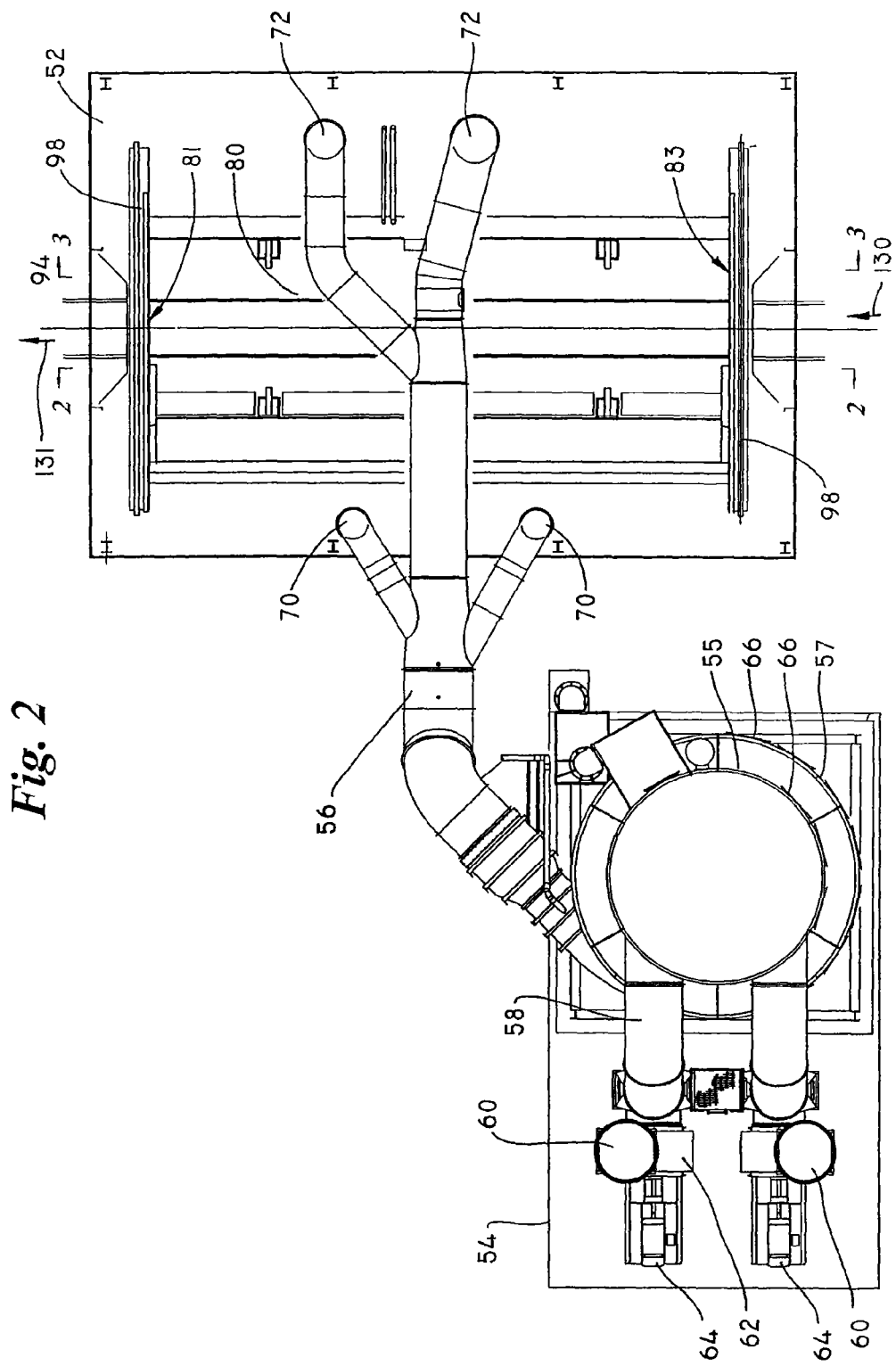
FIG. 2 is a top view of a rotary-dump facility according to an embodiment of the present invention.

Referring to FIGS. 1 and 2, a material dumpsite 50 is shown. Throughout this description, reference will be made to the configuration of the present invention for use at a coal dumping facility. However, the invention is well suited to the dumping of a wide range of dust producing materials, such as ore and grain.

The coal dumpsite 50 generally comprises a dumping facility 52 and a filter facility 54. The material to be dumped enters the dump facility 52, which is a rotary-type dump facility. The dumping of this material produces a dust cloud, which is sucked through ductwork and transferred to the filter facility 54 through air transfer ducts or conduits 56.

The filter facility 54, also known as a bag house, functions to separate the coal dust particles from the air to prevent environmental contamination and the possibility of explosion.

Bag houses 54 generally comprise an upper portion 55 and a lower portion 57 separated by a filter membrane assembly (not shown). The contaminated air is drawn through the filter assembly, and the filter assembly traps the contaminants in the lower portion 57 of the filter facility. Filtered air proceeds to the upper portion 55 of the filter facility 54 and exits through filtered air exit 58. The filtered air arrives at fan housing 62 and finally exits through a clean air exhaust duct 60. A drive motor 64 powers a fan (not shown) within fan housing 62. The drive motor 64 rotates the fan, which causes air to rapidly move through the entire system as described hereinabove. The negative pressure created within the system, located prior to the fan housing, drives the system by drawing the contaminated air into the system of the rotary-dump facility 52.

A contaminant particle collector 68 is disposed within filter facility 54 and in communication with the facility lower portion 57 to collect the contaminant particles that accumulate on the filtering assembly. From time to time, the filtering assembly may be vibrated or flushed with a reverse flow of air in order to remove accumulated contaminants. The filter assemblies and filter facility 54, as described herein, are more fully described in co-pending U.S. patent Ser. No. 10/037,319, which is hereby incorporated by reference.

The filter facility 54 may comprise more than one fan housing 62 and drive motor 64, as shown in FIG. 2. The ultimate number of drive motors depends on the capacity of the system in the particular installation and size of the individual motors utilized. A plurality of explosion vents 66 is provided to each of the upper and lower portions of the bag house 54.

In the event that a fire or explosion might occur in the bag house 54, the explosion vents 66 minimize potential damage. The powder from coal or grain dust is highly explosive, as discussed previously. The explosion vents 66, in conjunction with a remote filter facility 54 avoid damage to the dumping facility 52, which is in contrast to a dumping facility that encloses the filtering facility within the same housing as the dump facility.

Figure 3:
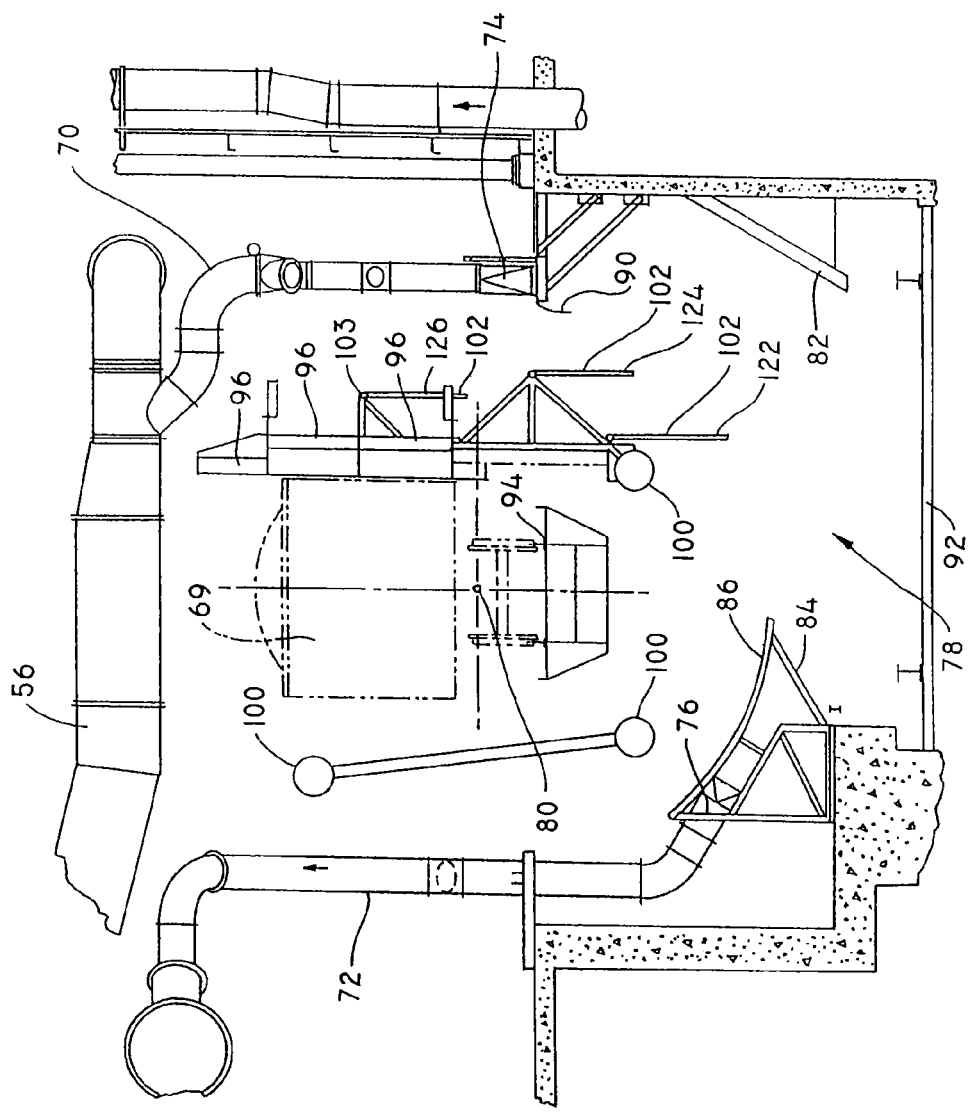
FIG. 3 is a sectional view of a rotary-dump apparatus with airflow control features according to an embodiment of the present invention.

Referring to FIG. 3, the coal dump facility 52 is shown with a coal car 69 in the upright configuration. The contaminated air enters the transfer duct 56 through a plurality of air inlet conduits 70, 72. The dump-side intake 70 is located on the side closest to the direction of the dumping and the back side intake 72 is located approximately opposite the dump-side intake 70. Each intake 70, 72 terminate in a respective dump-side hood 74 and backside hood 76. The intakes 70, 72 exhaust the contaminated air that emanates from the pit 78, which is located directly below the rotational dumping frame 80. Each of the intakes 70, 72 spans the length of the pit 78, as will be described below.

The pit 78 presents a plurality of features to cooperate in controlling the movement of the dust cloud produced by a dumping activity. A dump-side diverter 82 is positioned on the dumping side of the pit 78. The dump-side diverter 82 functions to both direct the flow of material being dumped, and to direct the airflow inside the pit 78. A backside airflow diverter 84 is positioned in the pit 78 approximately opposite of the dump side diverter 82. The backside diverter 84 is also referred to as the ski jump, due to the resemblance of its general shape.

The ski jump 84 comprises a curved upper surface 86 and lower surface 88. The backside hood 76 exhausts the dusty air from the pit 78 from beneath the lower surface 88 of the ski jump 84. The sloped upper surface 86 cooperates with features on the rotational frame 80 to seal the backside of the frame 80 and control the airflow during a dumping operation.

A dump-side hood baffle 90 protrudes from a portion of the side of the dump side hood 74. This baffle 90 is a flexible rubber member that spans the width of the pit 78. The baffle 90 is preferably a 3/16 inch thick belt comprised of 2-ply Dulon and 150# polyester. Baffle 90 is preferably of sufficient length to droop into the pit area 78. The dump-side baffle 90 functions to control the airflow in the pit and induce a tumbling effect to the dust cloud caused by a dumping operation. The amount of time a dust cloud is retained in the pit is increased by making the cloud tumble, rather than naturally billowing straight up. Thus, the air intakes 70, 72 have more time to exhaust the dust cloud than if no dust cloud tumbling were provided.

A grizzly 92 defines the bottom of the dumping pit 78. A hopper 94, as shown in FIG. 1, is disposed below the grizzly 92. The grizzly 92 comprises a grid that screens impurities from the coal in car 69 that are larger than the aperture size in the grid. These impurities may include rocks and timber. The hopper 94 funnels the coal into a receiving pit, transport container or conveyor for transportation, storage or later use.

The rotational frame 80 comprises a section of track 94 that is approximately the same length as a rail car 69. The track 94 is sealed below, on the dump side and on the back side by plates 96 to prevent the escape of dust during a dumping operation. Each of the front 81 and back ends 83 of the rotational frame 80 are fastened to end plates 98 (shown in FIG. 2). The end plates 98 are configured to permit the rotation of the frame 80 about an axis centered at the coupling of the rail car 69, thereby permitting the cars 69 to remain coupled during a dumping operation. The rotational frame 80 receives a plurality of counterweights 100 to balance the car 69 and frame 80 during rotational motion.

Figure 17:
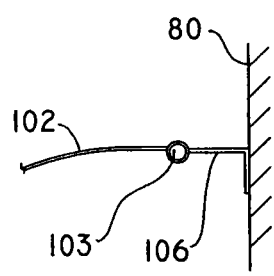
FIG. 17 is a detail view of a baffle according to an embodiment of the present invention.

A plurality of frame baffles 102 are provided to the dump side 81 of rotational frame 80. Referring to FIGS. 3, 12, 13 and 15, the baffles 102 are placed at multiple positions on the dump side of the rotational frame 80. FIG. 3 depicts three baffles 102 mounted to the frame 80 via hinged 103 fasteners. Such arrangement is shown with more detail in FIG. 17. The hinges 103 allow the baffles 102 to hang vertically regardless of the orientation of the rotational frame 80, as shown in FIGS. 3 though 8.

Figure 14:
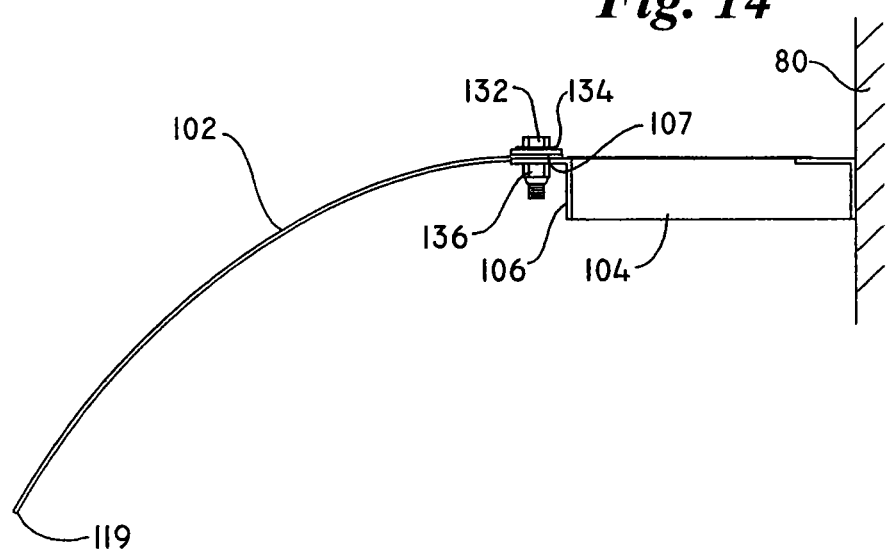
FIG. 14 is a detail view of a baffle according to an embodiment of the present invention.
Figure 13:
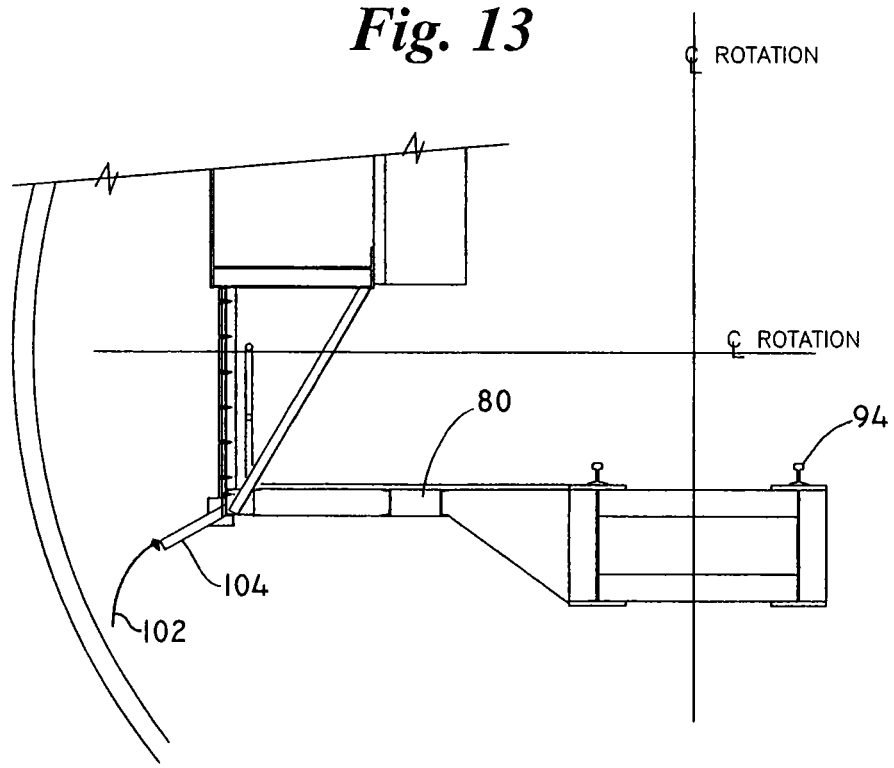
FIG. 13 is a detail end view of a rotary-dump frame with baffle according to an embodiment of the present invention.
Figure 15:
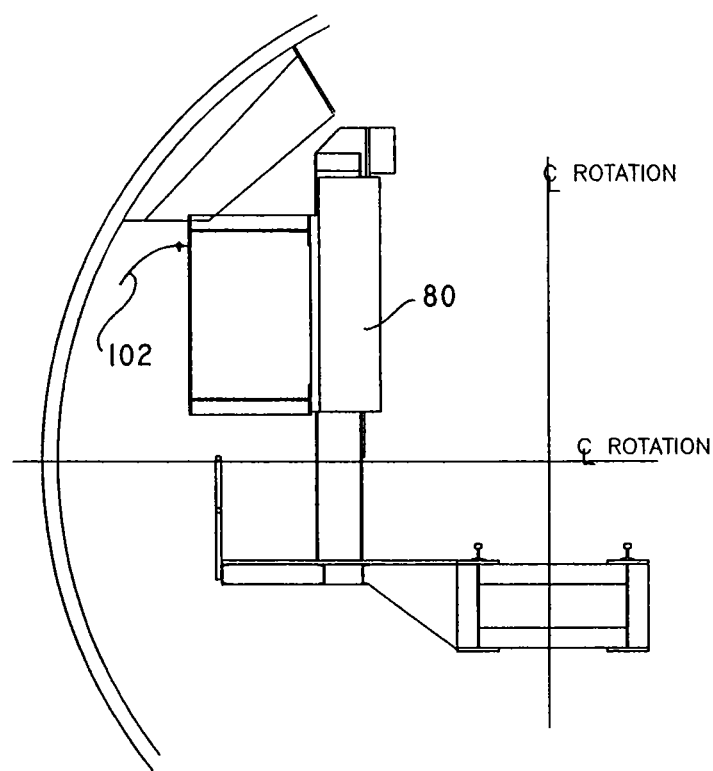
FIG. 15 is a detail end view of a rotary-dump frame with baffle according to an embodiment of the present invention.
Figure 16:
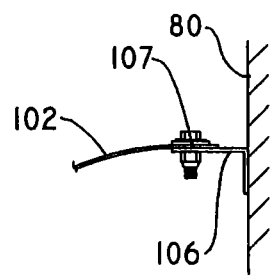
FIG. 16 is a detail view of a baffle according to an embodiment of the present invention.

FIGS. 14 and 16 depict an alternative mounting configuration for the baffles 102. An extension member 104 extends from the plate 96 to a fixed distance. The extension member is rigid. The baffle 102 is then fastened to the end of the extension member 104 via a hinged fastener 103, as in FIG. 17, or by way of a fixed bracket 106, as shown in FIG. 14. A further alternative involves fastening the fixed bracket 106 directly to the side of the frame 80 or plate 96 without an extension member 104, as shown in FIG. 16.

FIGS. 18a and 18b depict a baffle 102 according to a preferred embodiment. The baffle 102 comprises a top edge 108, bottom edge 110, first side edge 112, second side edge 114, two longitudinal side surfaces 116, 118 and leading edge 119. The baffles 102 preferably extend the approximate length of the pit 78, which is slightly longer than the length of a rail car 69. Alternatively, a baffle 102 may comprise a series of baffle segments that, when operated as an assembly, are equivalent to a single baffle 102 spanning the approximate width of the pit 78.

Each baffle 102 is preferably fastened to a mounting bracket 106 by way of a plurality of threaded fasteners 107 extending through a respective plurality of apertures 120 in baffle. The apertures 120 communicate between the longitudinal surfaces 116, 118 of the baffle 102 and are equally spaced about a line adjacent the top 108 of the baffle 102. A threaded bolt 132 is provided with a washer 134 (to minimize tearing through the aperture) to sandwich a portion of the baffle between the washer and a surface of the mounting bracket. The opposite surface of the bracket receives a locking washer (not shown) and threaded nut 136. Those having skill in the art will recognize that other means for fastening the baffles 102 to the mounting brackets 106, such as clamps and adhesives, may be used without departing from the spirit and scope of the present invention. The baffles 102 are preferable made from the same material as the dump-side hood baffle 90. However, any flexible and rugged material may be used within the scope of the present invention.

Figure 4:
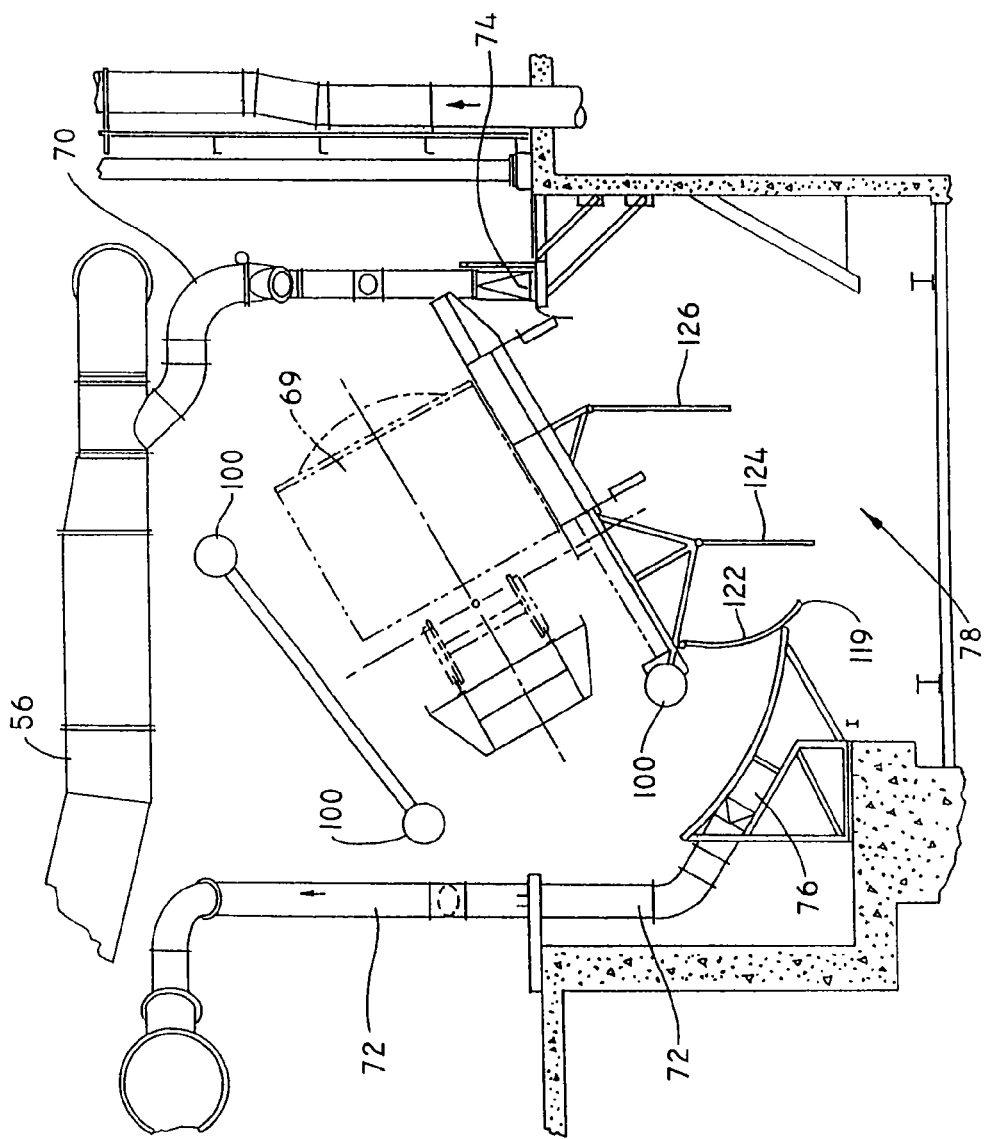
FIG. 4 is a sectional view of the rotary-dump apparatus of FIG. 3 in partial rotation.

Referring to FIGS. 3 through 8, three baffles 102 are shown on rotational frame 80 throughout various points of a dumping cycle. Embodiments using fewer or greater numbers of baffles 102 are contemplated by the present invention. In FIG. 3, the frame 80 is in a full upright position. FIG. 4 shows the frame 80 rotated through approximately 60 degrees of motion. The first 122 of three baffles, 122, 124, and 126, is arched due to contact with the ski jump 84. The length of each baffle 122, 124, 126 is preferably such that it will bow slightly, as shown in the figures, when contacting the upper surface 88 of the ski jump 84.

Figure 5:
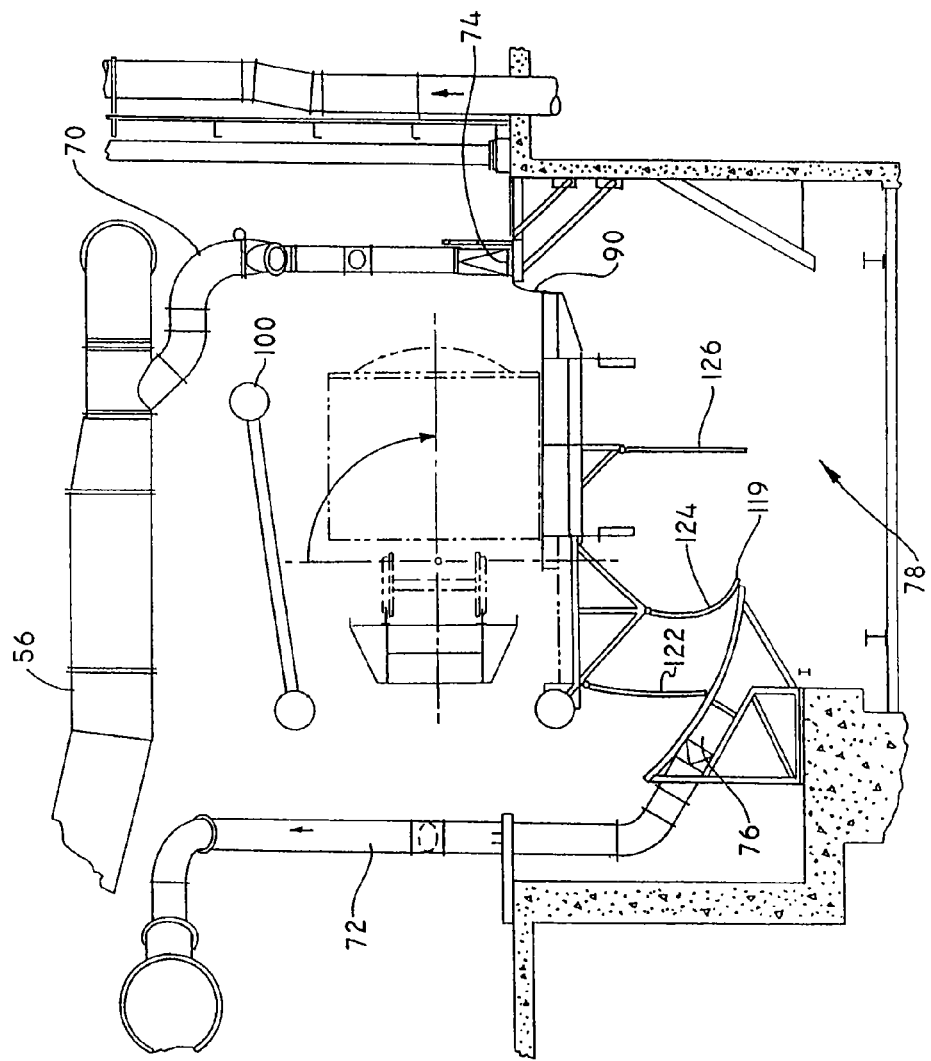
FIG. 5 is a sectional view of the rotary-dump apparatus of FIG. 3 in partial rotation.

FIG. 5 shows the frame 80 at 90 degrees of rotation. Now, each of the first 122 and second 124 baffles are atop the ski jump 84, thereby causing the baffles 122, 124 to bow. The contact between the upper surface 86 of the ski jump 84 and the leading edge 119 of the baffles 122, 124, 126 effectively bars the dust cloud from escaping out the backside of the dumping frame 80. The cloud is sealed in the pit 78 until removed by the ducts 70, 72.

Figure 6:
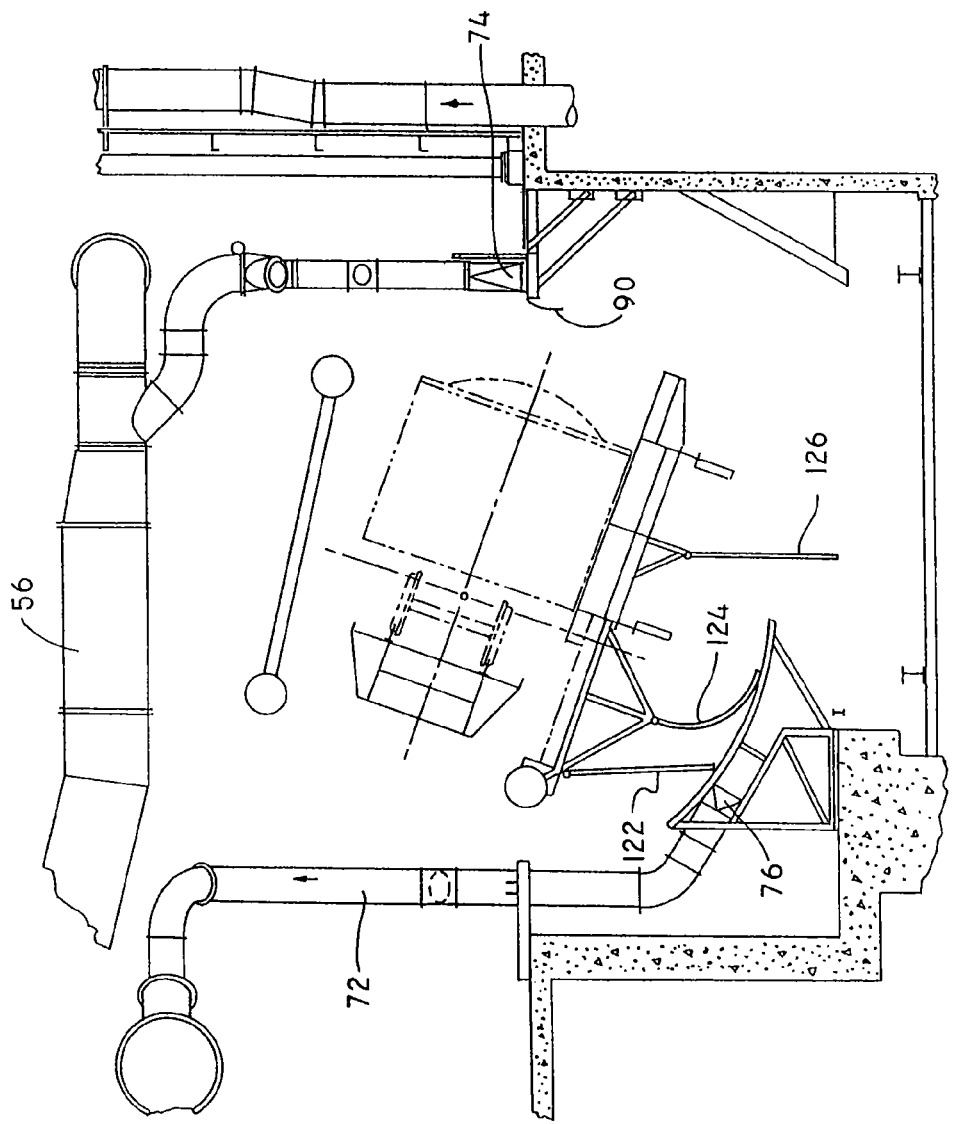
FIG. 6 is a sectional view of the rotary-dump apparatus of FIG. 3 in partial rotation.

FIG. 6 shows the frame 80 at approximately 110 degrees of rotation. Now, only the second 124 of the baffles 122, 124, 126 is in contact with the ski jump 84. This illustrates the point that, starting at approximately 60 degrees of rotation, one or more of the number of baffles 122, 124, 126 is in contact with the ski jump 84 to provide a seal on the backside of the frame 80.

Figure 7:
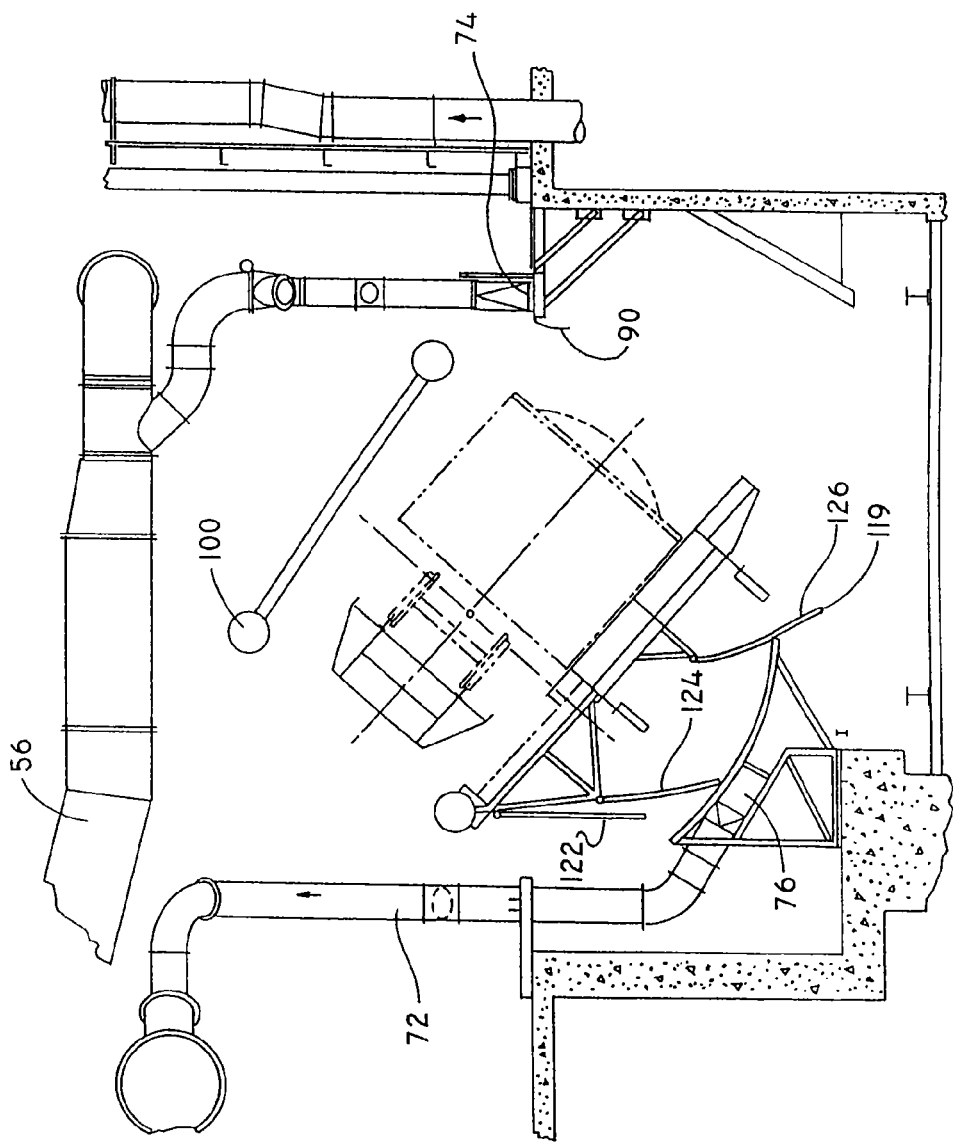
FIG. 7 is a sectional view of the rotary-dump apparatus of FIG. 3 in partial rotation.
Figure 8:
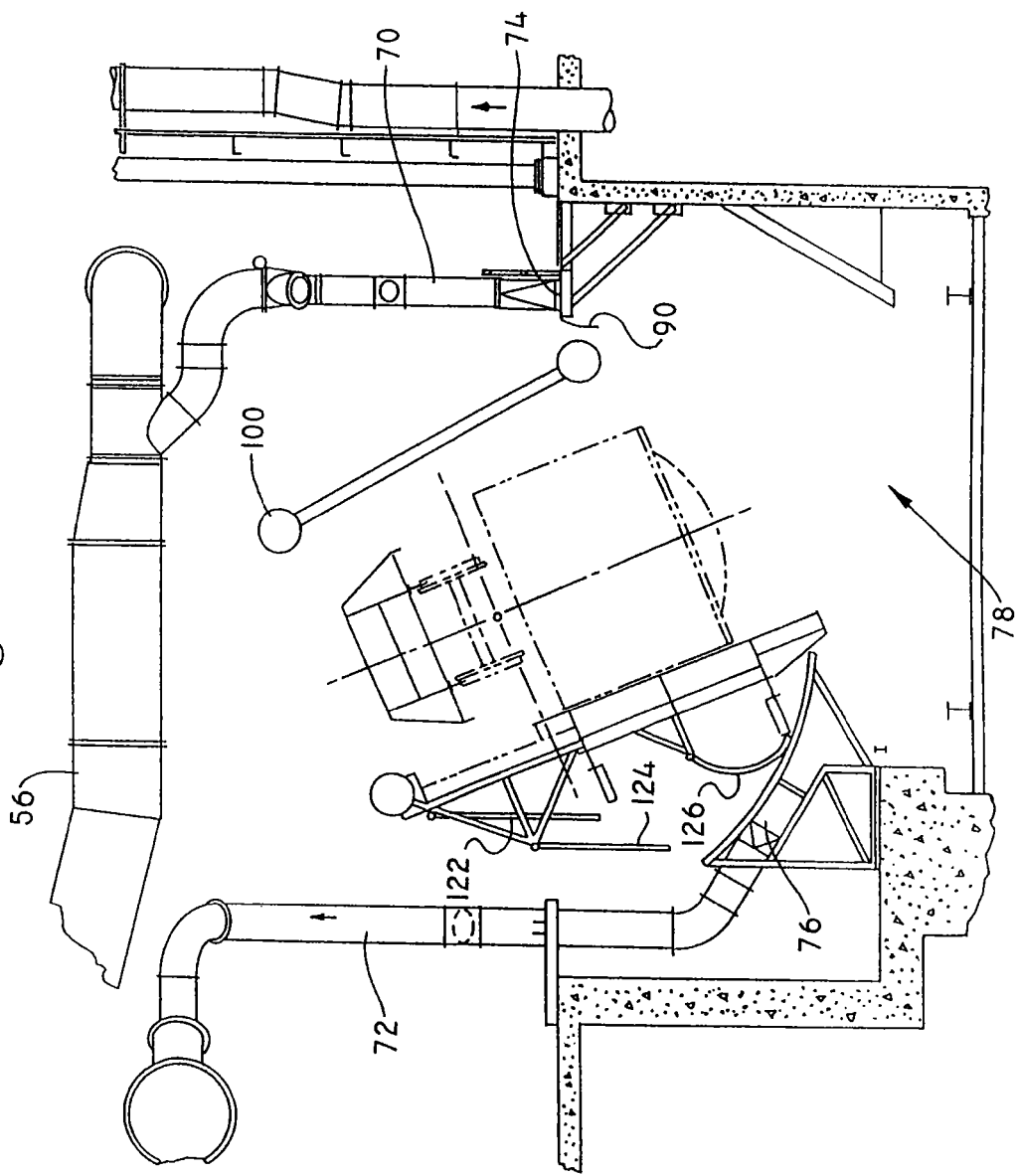
FIG. 8 is a sectional view of the rotary-dump apparatus of FIG. 3 at full rotational travel.

FIG. 7 shows the frame 80 at approximately 130 degrees of rotation. Now, the third baffle 126 is in contact with the ski jump 84 and the first baffle 122 is completely past the jump 84. The frame 80 continues its rotation until coming to 160 degrees of rotation as shown in FIG. 8. One hundred sixty degrees (160°) is a complete dumping motion for the depicted embodiment. Typically, the rail car 69 need not be rotated more than hundred sixty degrees (160°) to achieve full dumping.

The baffles 102 also provide the additional benefit of scraping the top surface 86 of the ski jump 84 with the leading edge 119 when the car 69 is rotated in the opposite direction. The scraping action shovels any accumulated dust off of surface 86. This configuration results in a self-cleaning mechanism, which minimizes the need to periodically clean surfaces in the dump facility.

Figure 9:
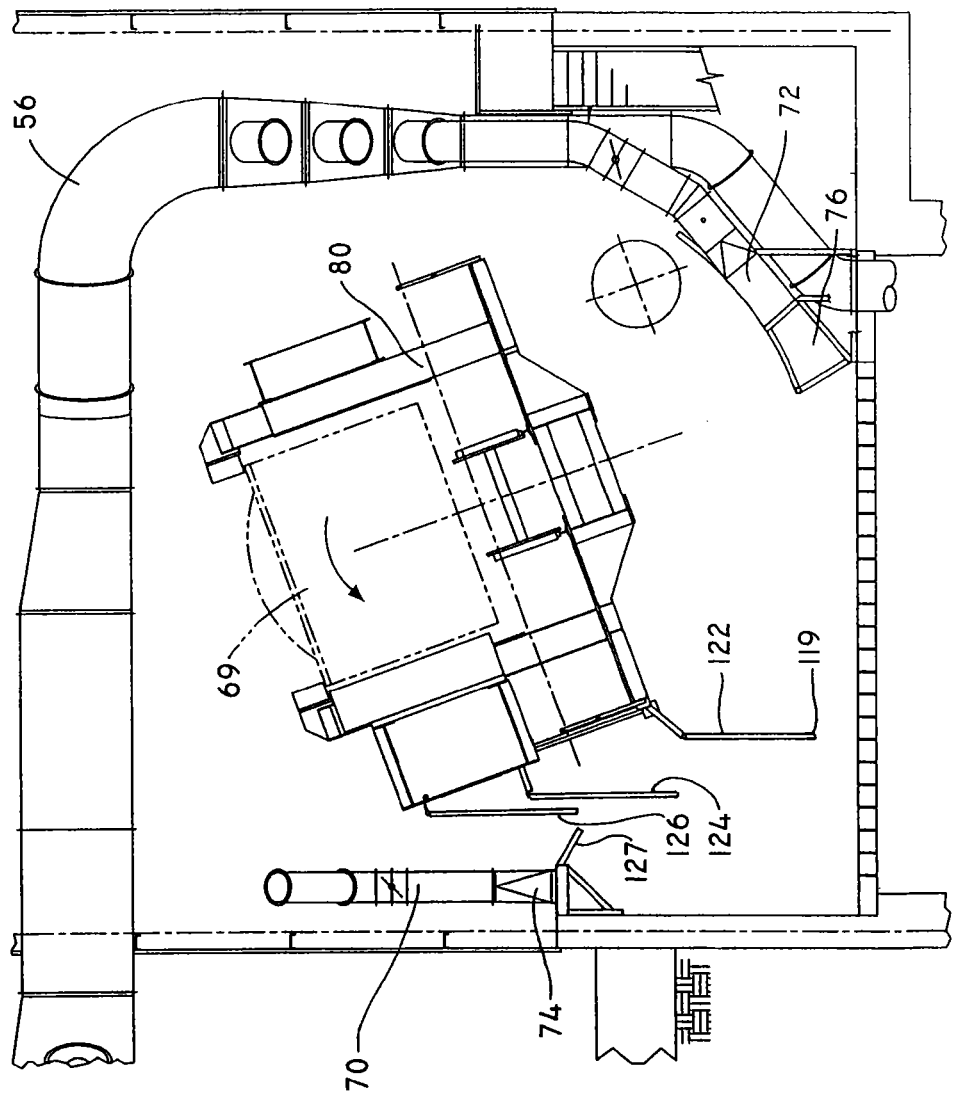
FIG. 9 is a sectional view of a rotary-dump apparatus with airflow control features according to an embodiment of the present invention at partial rotation.
Figure 10:
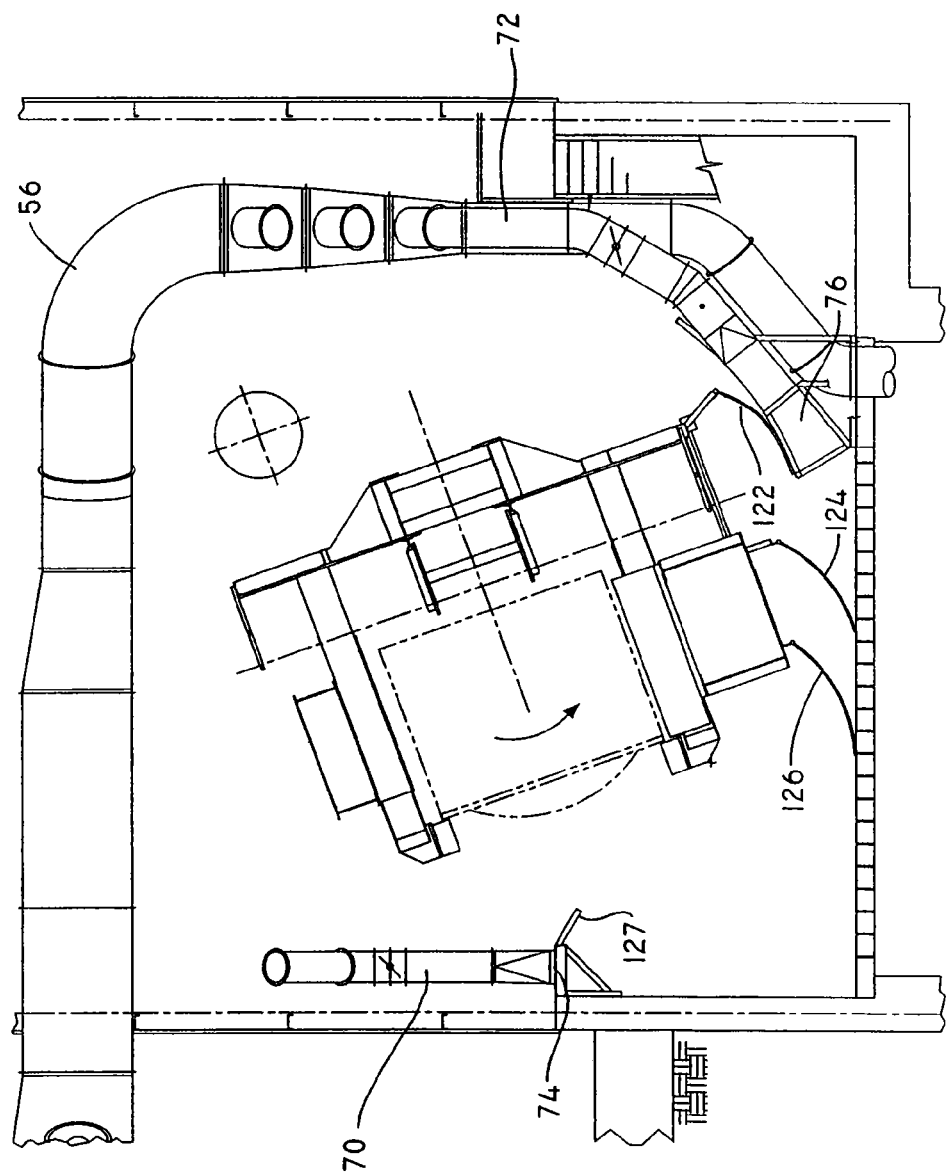
FIG. 10 is a sectional view of the rotary-dump apparatus of FIG. 9 in partial rotation.
Figure 11:
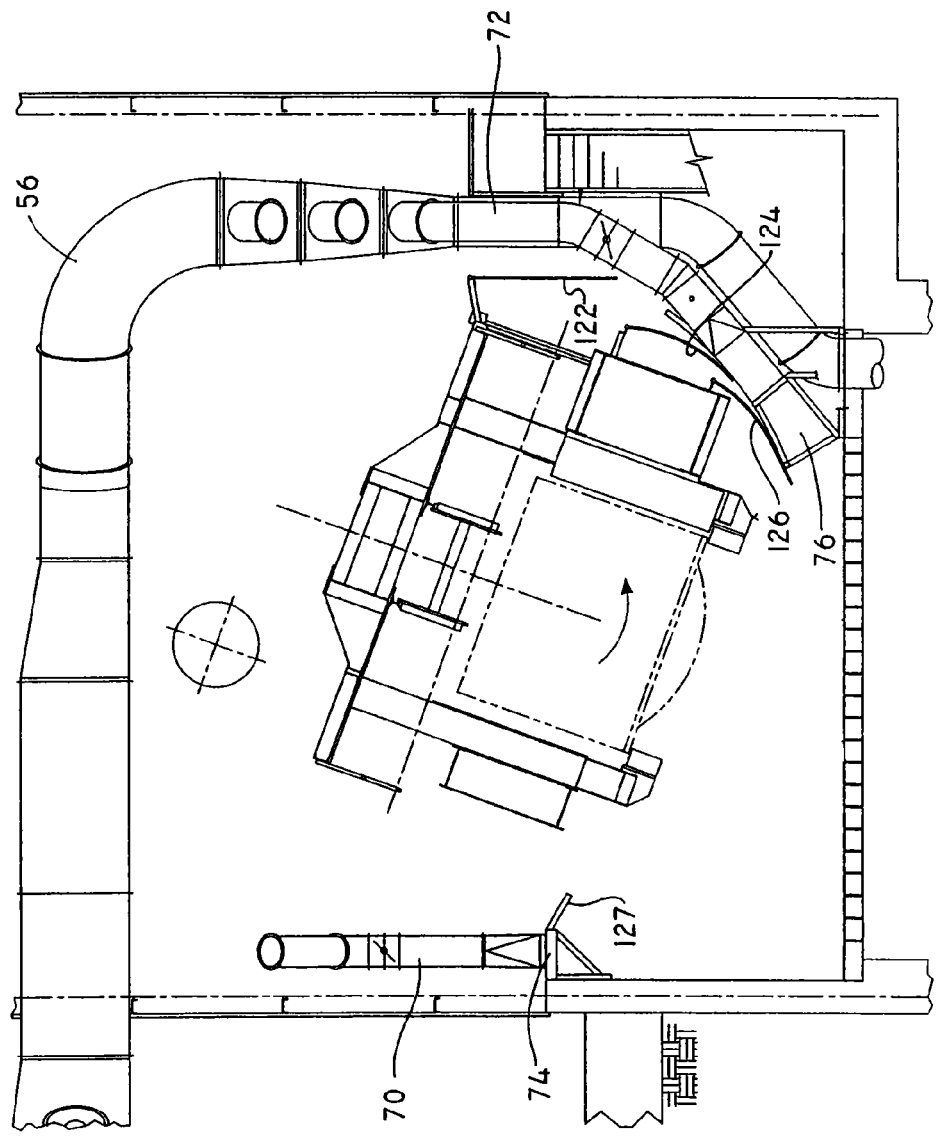
FIG. 11 is a sectional view of the rotary-dump apparatus of FIG. 9 at full rotational travel.
Figure 12:
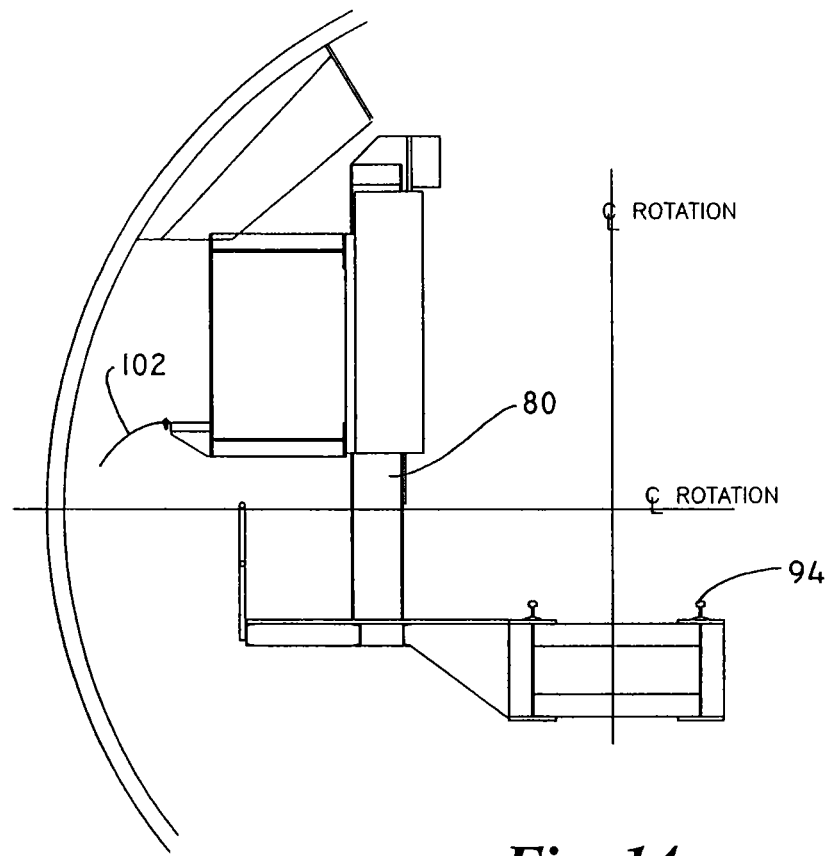
FIG. 12 is a partial detail end view of a rotary-dump apparatus according to an embodiment of the present invention.

FIGS. 9, 10 and 11 depict an alternative embodiment of the present invention wherein the rotary-dump facility 52 is configured to allow for a 180 degree dumping motion, while continuing to manage the airflow as previously discussed. These figures also illustrate that a counterclockwise direction dumping motion may be employed without departing from the spirit and scope of the present invention. Three baffles 122, 124, 126 are again shown as being hingedly fastened to the dump frame 80. The second 124 and third 126 baffles are now disposed on protruding extension members 104. A rigid airflow diverter member 127 is shown mounted in place of the hood baffle 90 to create the tumbling effect on the dust cloud within the pit 78.

The configuration of the ski jump 84 is modified with respect to that shown in FIGS. 3-8 to accommodate the additional 20 degrees of rotation without structural interference between the ski jump 84 and the frame 80. The sloped surface 86 of the ski jump 84 does not extend past the end of the backside hood 76 to provide the required clearance. FIG. 9 shows that the upper surface 86 of the jump 84 no longer extends vertically above the backside hood 76, as it did in FIG. 3. FIGS. 9-11 show the frame 80 at 20°, 110° and 160°, respectively. The frame 80 may continue to rotate until reaching 180° without interference from the various dumping structures.

Figure 19:
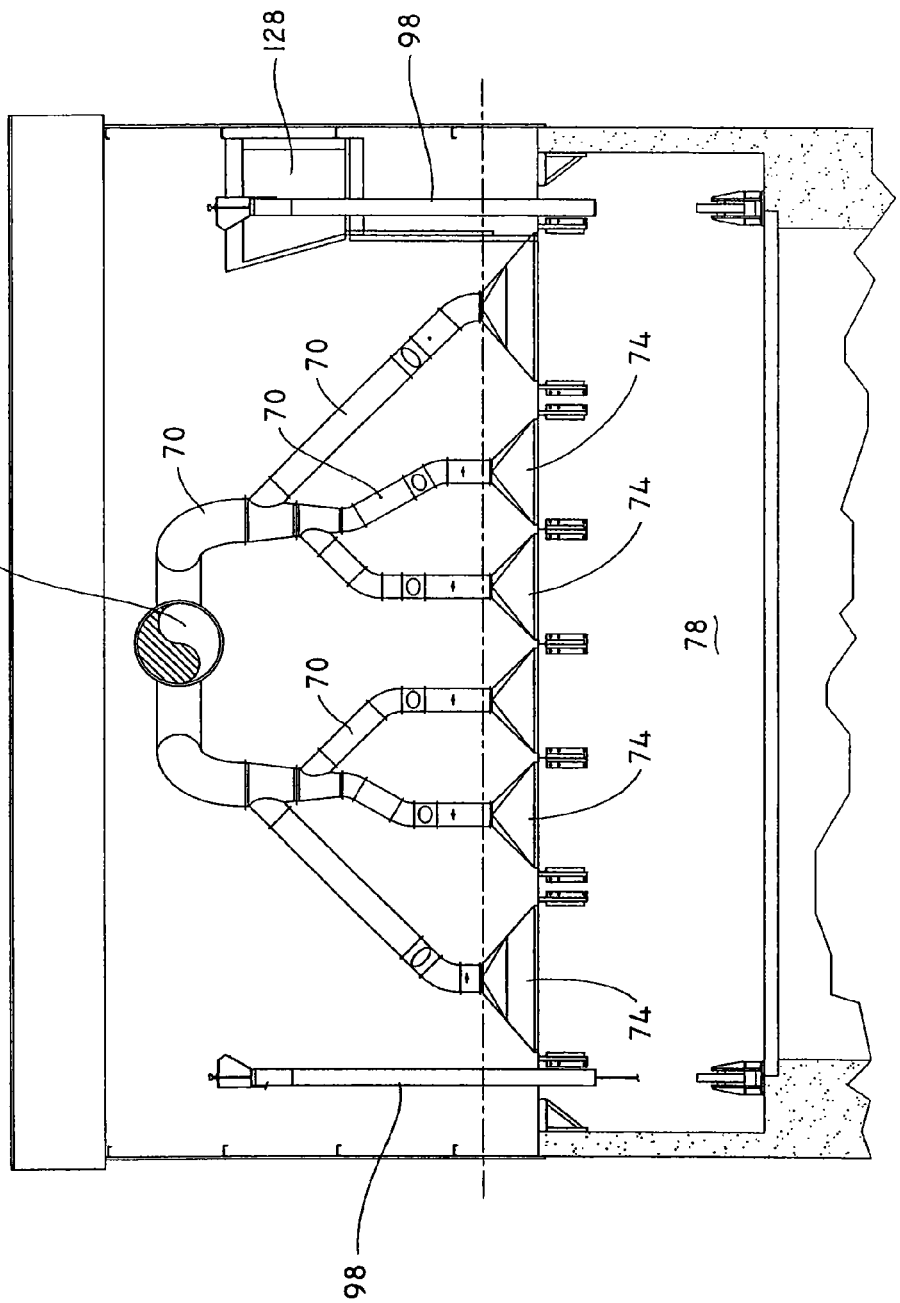
FIG. 19 is a sectional side view of a rotary-dump apparatus according to an embodiment of the present invention taken along line 2-2 of FIG. 2.

Referring to FIGS. 19 through 22, various views of the rotary-dump facility 52 are shown to illustrate the hood 74, 76 and duct placements 70, 72 according to the preferred embodiment. FIG. 19 shows a side sectional view of the dump side of the dump facility 52. A plurality of dump side air intake ducts 70 branch off of the transfer duct 56. Each branch 70 terminates in a hood 74. The hoods 74 are approximately aligned with the top of the pit 78. The hoods 74 span almost the entire distance between the end plates 98.

The operator station 128 is also shown in FIG. 19. The operator station 128 is generally placed above the dump side of the rotational frame 80 to provide the operator with a clear view of the pit area 78 and the grizzly 92. This way, the operator may observe the dumping procedure to ensure safety and efficiency. Prior art systems that completely enclose the rail car 69 do not permit the operator to easily observe a dumping procedure.

Figure 20:
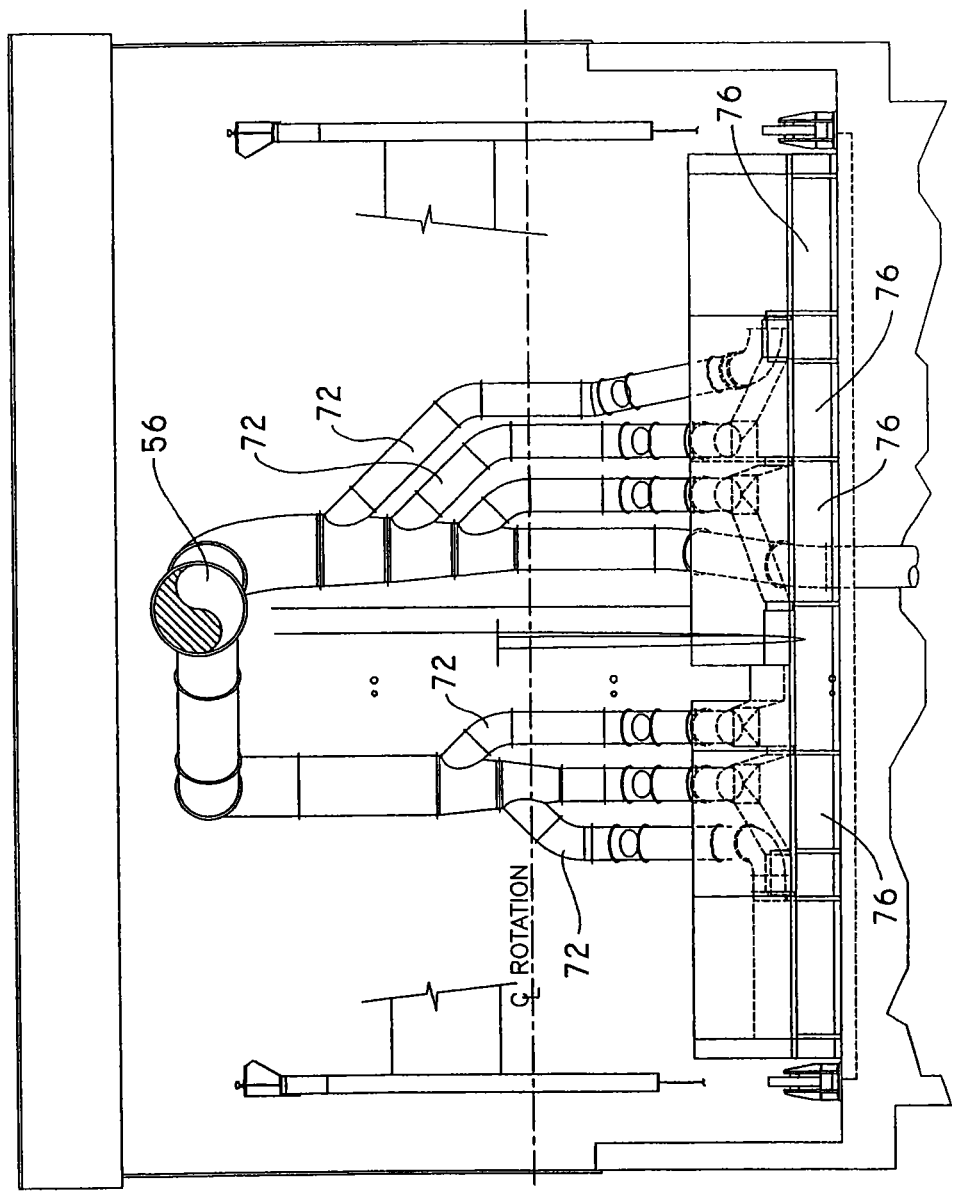
FIG. 20 is a sectional side view of a rotary-dump apparatus according to an embodiment of the present invention taken along line 3-3 of FIG. 2.

FIG. 20 shows a side sectional view of the backside of the dump facility 52. A plurality of backside air intake ducts 72 branch off of the transfer duct 56. Each branch terminates in a hood 76. The hoods 76 are positioned near the bottom of the pit 78. The relative positions of the dump-side 74 and backside 76 hoods may also be seen in FIG. 3. The hoods 76 span almost the entire distance between the end plates 98.

Figure 21:
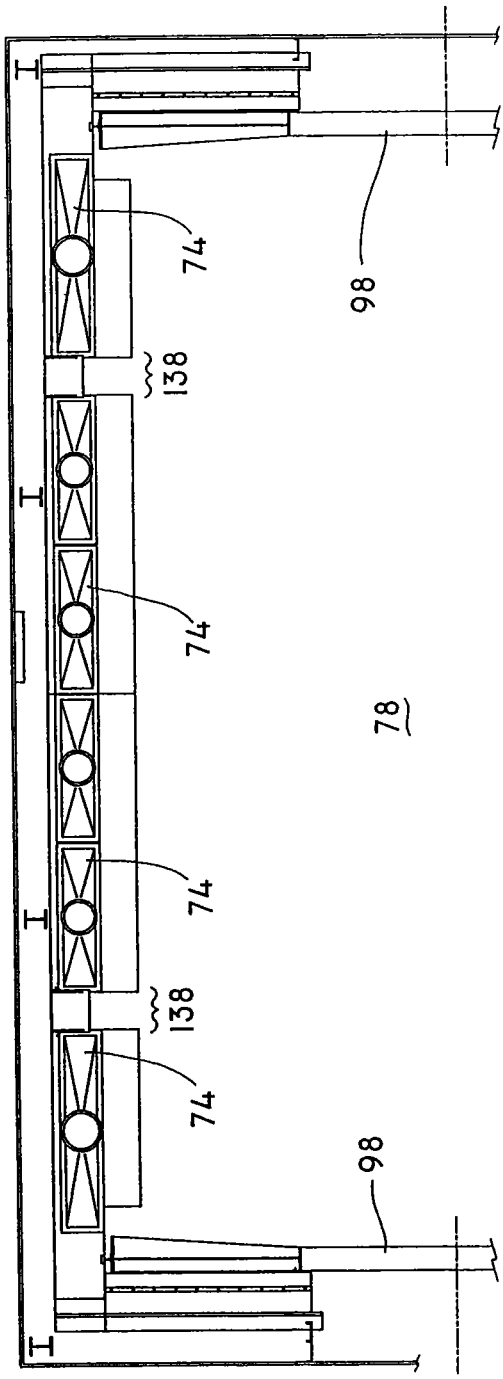
FIG. 21 is a partial top detail view of a rotary-dump apparatus according to an embodiment of the present invention.
Figure 22:
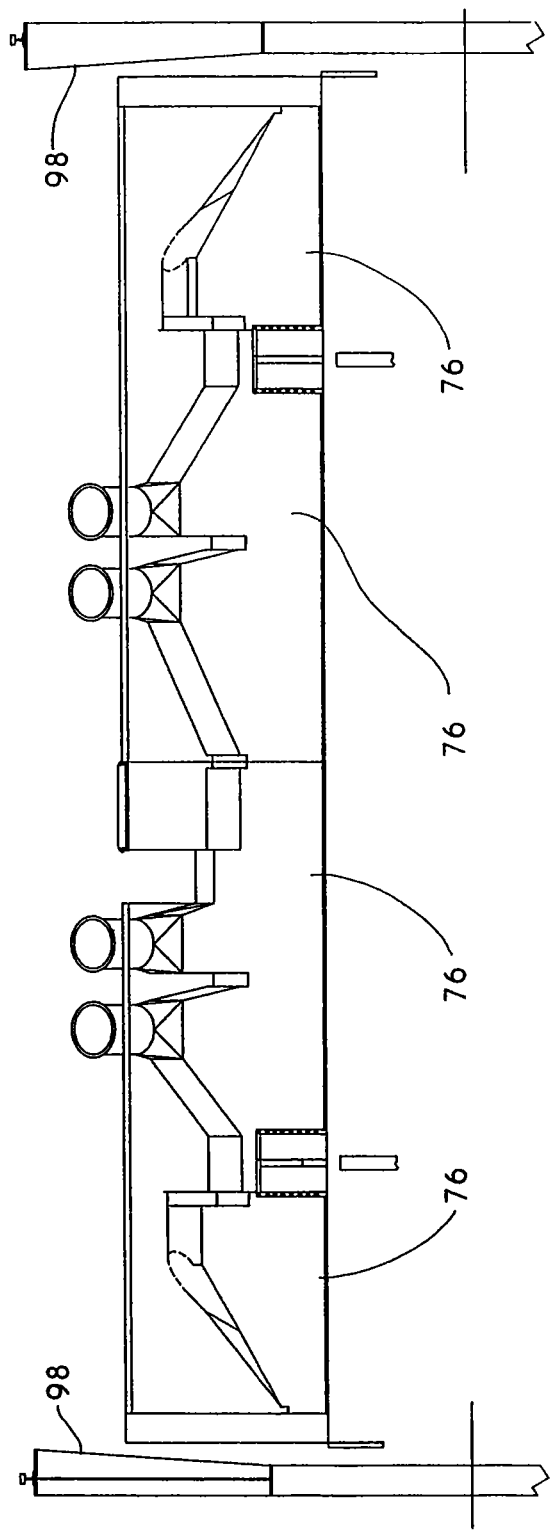
FIG. 22 is a partial top detail view of a rotary-dump apparatus according to an embodiment of the present invention.

FIG. 21 shows a top partial sectional view of the dump side intakes 70 and respective hoods 74. There are only relatively small gaps 138 between adjacent hoods 74, 76. The minimal gaps 138 create a generally constant wall of suction to remove the dust cloud quickly. FIG. 22 shows a top sectional view of the backside hoods 76. The upper surface 86 of the ski jump 84 is outlined as a location reference.

A major design goal for a dump-site 50 is to balance the system effectiveness with its efficiency. It is theoretically possible to remove a volume of air sufficient to dismiss the dust cloud without using any sealing systems. However, such systems would require enormous drive motors and would be undesirably inefficient. Therefore, it is a constant design goal to reduce the airflow to around 140,000 cubic feet per minute. The present invention provides a system and method that allows those design goals to be achieved in the preferred embodiments. To help achieve this goal, approximately 60 percent of the air volume is preferably removed from the backside duct system 72. The remaining 40 percent is removed from the front or dump side 70. The air duct hoods 74, 76 are spaced so as to achieve an even air distribution along the entire length of the dump frame 80.

Increasing the time the dust cloud is retained in the pit 78 allows a lower volume system to work effectively. Configuring the system as described herein and shown in the figures increases the retention time by tumbling the air below the dump frame 80 in the pit 78. The tendency of the tumbling air is to remain in the sealed confines of the pit 78, rather than seeking to escape. The baffles 102 and other features described herein contribute to this tumbling effect.

Figure 29A:
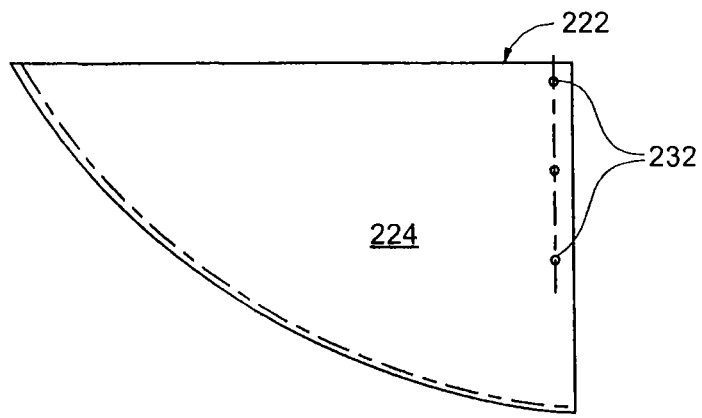
FIG. 29a is a front elevational view of an end of hood close off panel in accordance with the present invention.
Figure 29B:
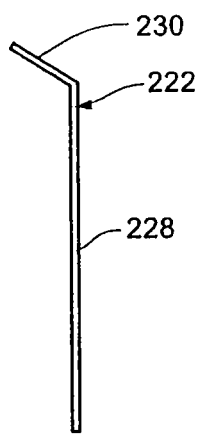
FIG. 29b is an end elevational view of end of hood close off panel.
Figure 29C:
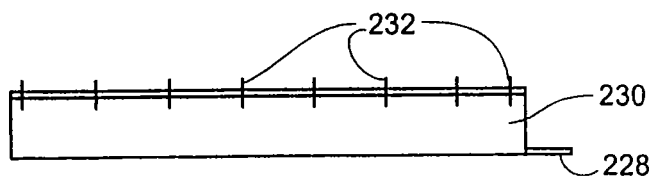
FIG. 29c is a plan view of end of hood close off panel.

Referring to FIGS. 29a, 29b and 29c, end of hood close off panel 222 includes arcuate shaped flat portion 228 and angled panel 230. End of hood close off panel 222 is secured to platen support wall 224 by fasteners 232.

Figure 30:
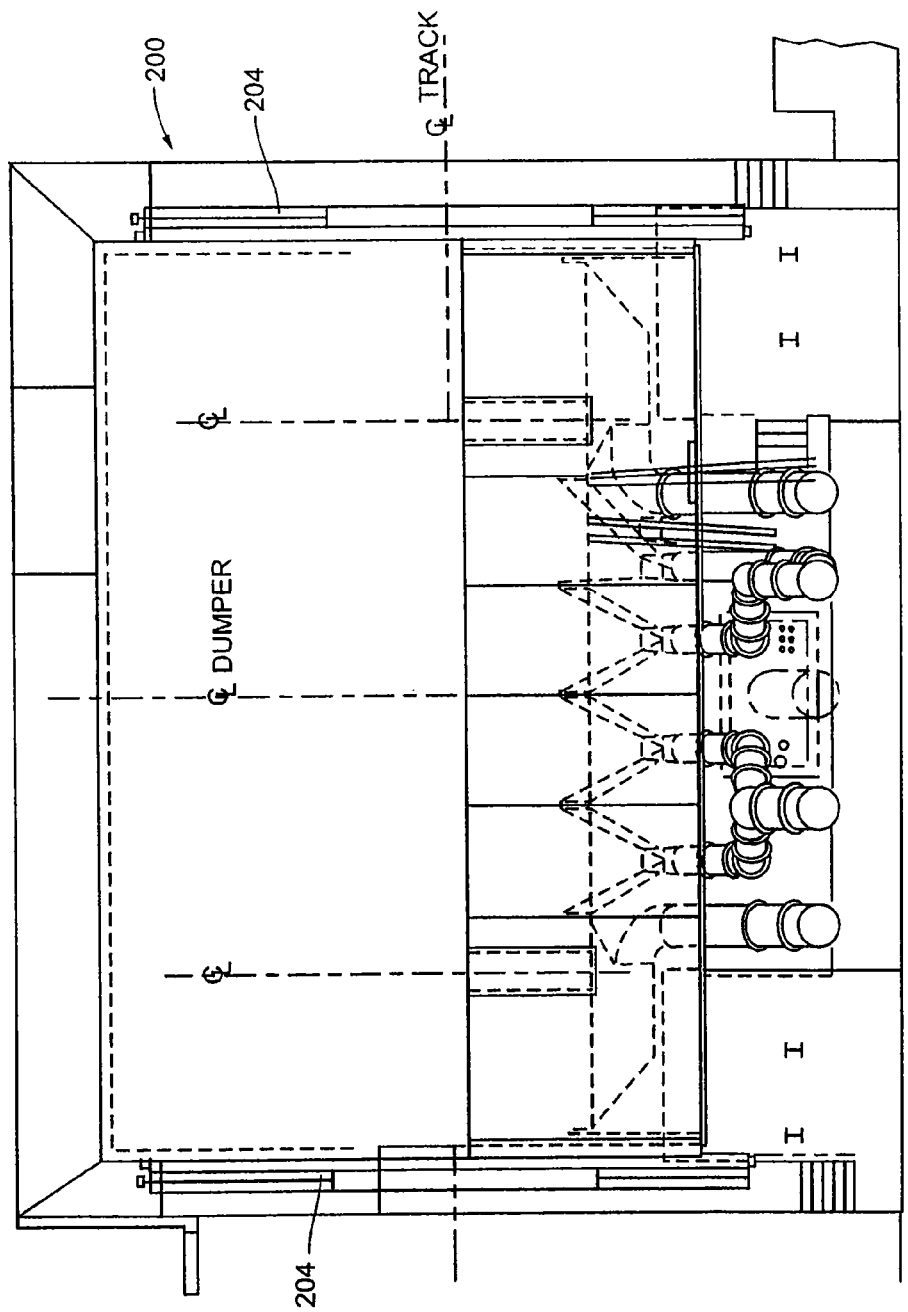
FIG. 30 is a schematic plan view of a rings out rotary dumper facility.
Figure 31:
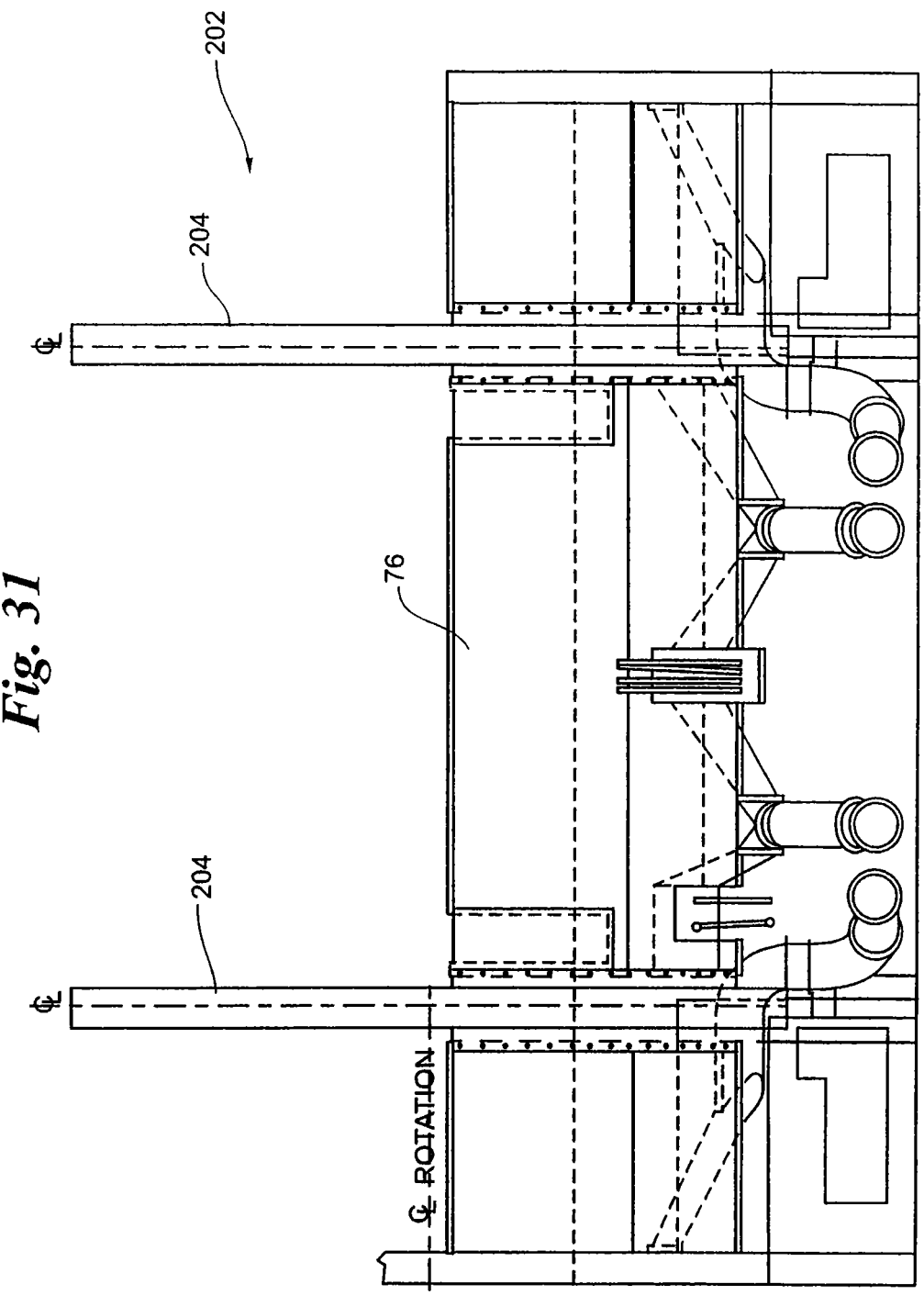
FIG. 31 is a schematic plan view of a rings in rotary dumper facility.

Referring to FIGS. 30 and 31, FIG. 30 depicts a rings out dumper facility 200. FIG. 31 depicts a rings in dumper facility 202. Referring to FIG. 30, in a rings out dumper facility 200 supporting rings 204 are located at the far ends of the car dumper 206. Referring to FIG. 31, in a rings in dumper facility 202 supporting rings 204 are located some distance inboard of the ends of car dumper 206.

Figure 23:
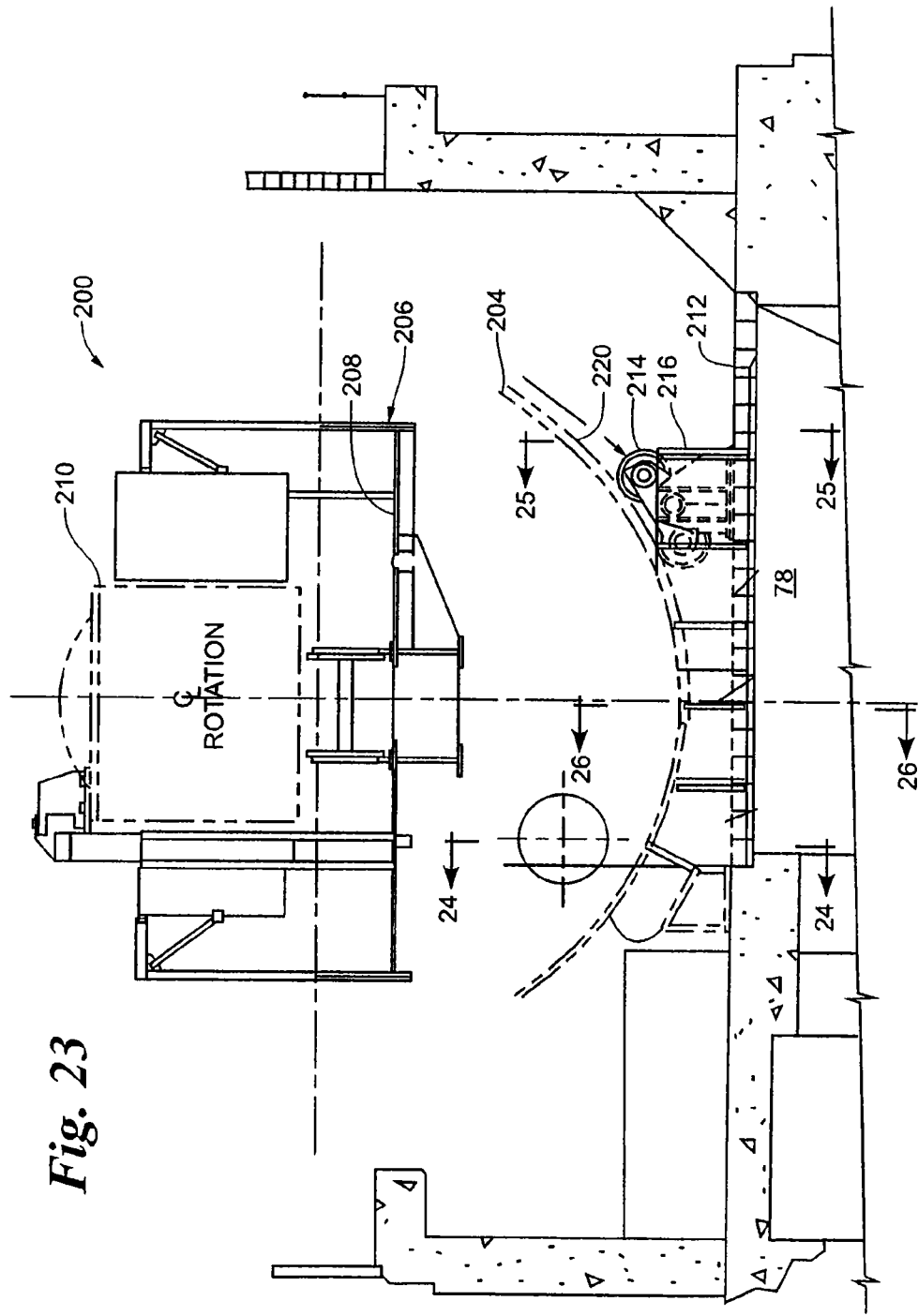
FIG. 23 is a sectional view of a rings out rotary-dump apparatus in accordance with the present invention.

Referring to FIG. 23, rings out dumper facility 200 generally includes support rings 204, car dumper 206, dumper platen 208, supported rail car 210, grizzly 212, dual wheel trunion 214 and end ring baffle 216. Support rings 204 support dumper platen 208 of car dumper 206. Railcar 210 is supported by dumper platen 208. Grizzly 212 is at the bottom of rings out dumper facility 200. Grizzly 212 is a grating with openings through which dumped material may fall. Dual wheel trunion 214 supports supporting rings 204 thus, supporting car dumper 206 as it turns.

Referring to FIGS. 23-27, end ring baffle 216 is located near to dumper pit wall 218 but inside of supporting ring 204. End ring baffle 216 is attached to the end of and extends upwardly from grizzly 212. End ring baffle 216 extends upwardly slightly beyond perimeter 220 of supporting ring 204. The edge of end ring baffle 216 generally follows the perimeter 220 of supporting ring 204.

Figure 24:
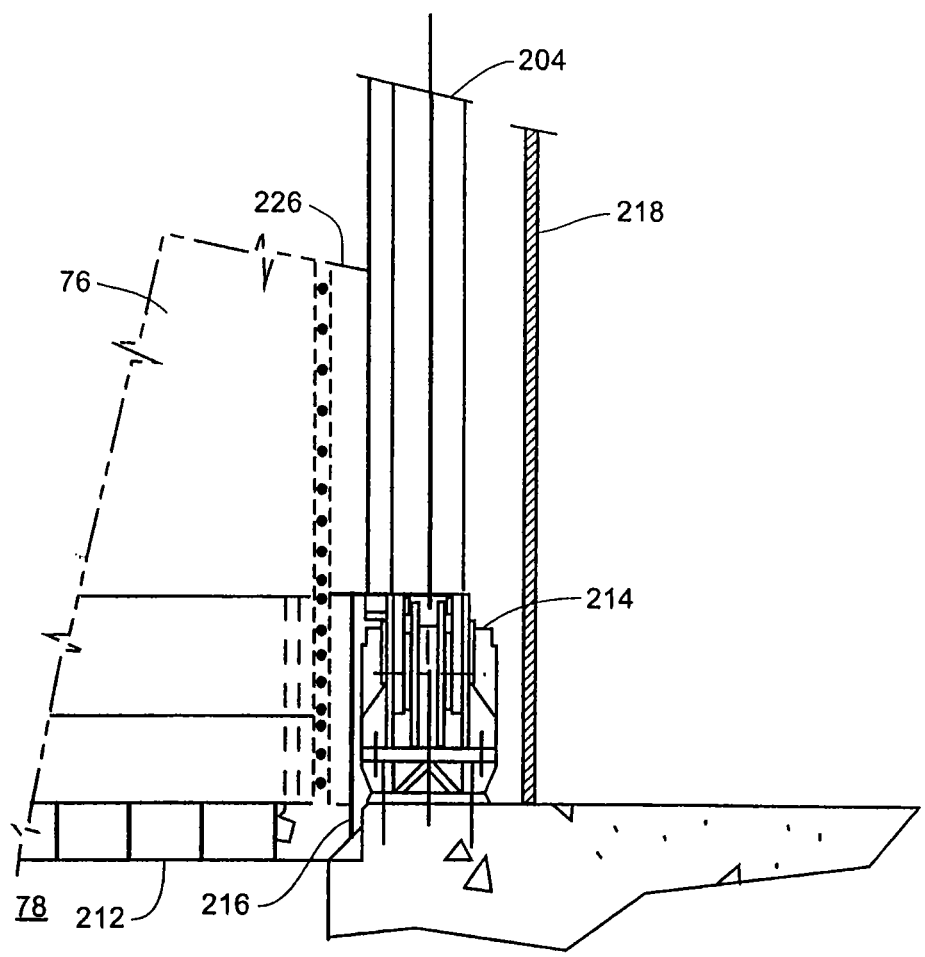
FIG. 24 is a sectional view taken along elevational line 24-24 of FIG. 23.
Figure 25:
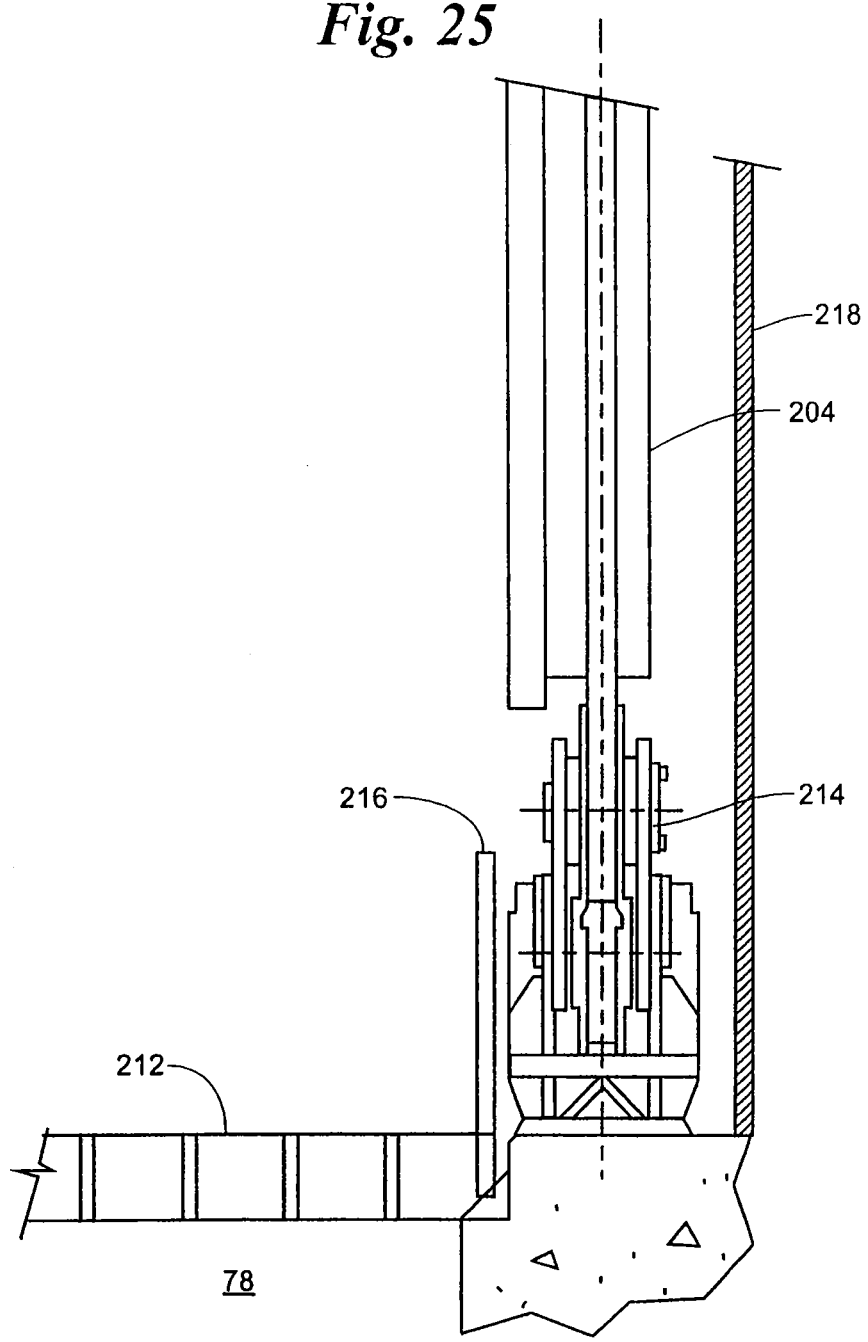
FIG. 25 is a sectional view taken along section line 25-25 of FIG. 23.
Figure 26:
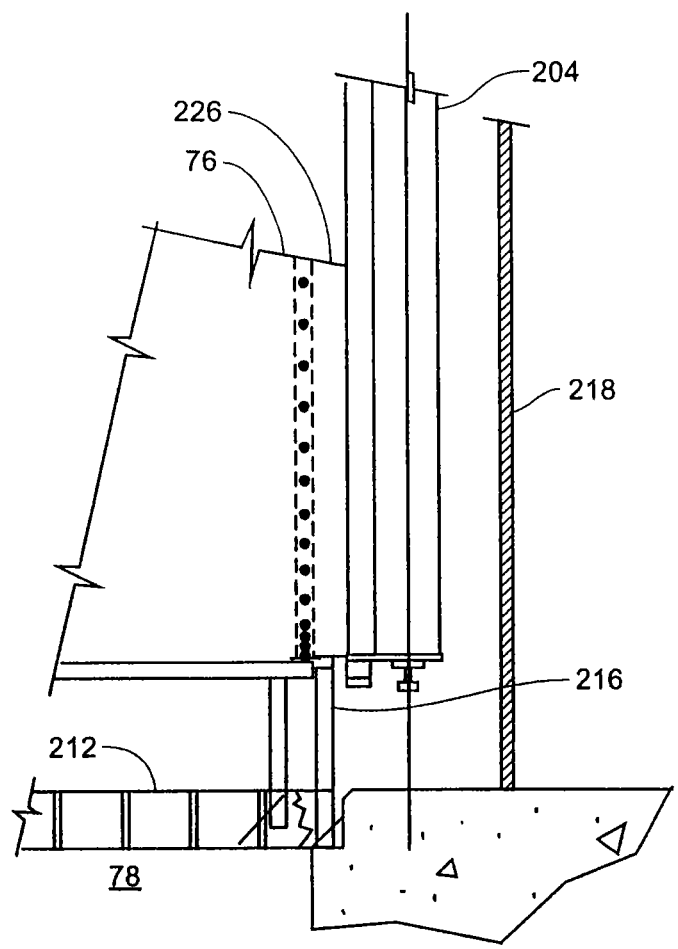
FIG. 26 is a sectional view taken along section line 26-26 of FIG. 23.

End ring baffle 216 is secured to grizzly 212 and caulked along its length to create a dust and air resistant shield. End ring baffle 216 is also secured to backside hood 76. Referring to FIGS. 24 and 26, belting 226 may be utilized along the edge of backside hood 76 to seal backside hood 76 to supporting ring 204.

Figure 27:
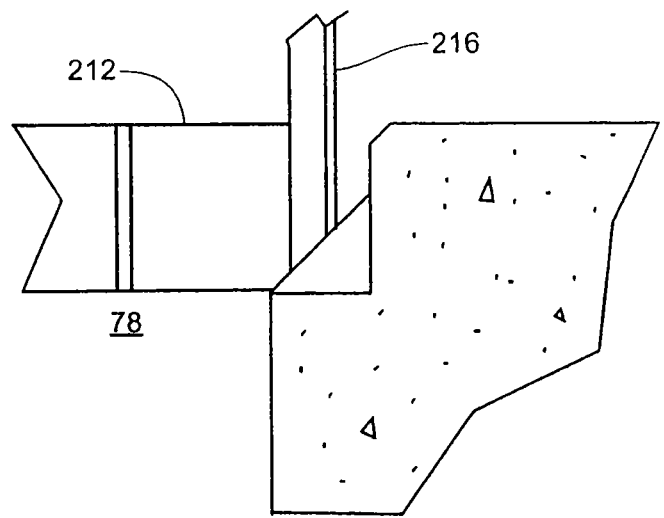
FIG. 27 is a detailed sectional view taken from FIG. 26.
Figure 28:
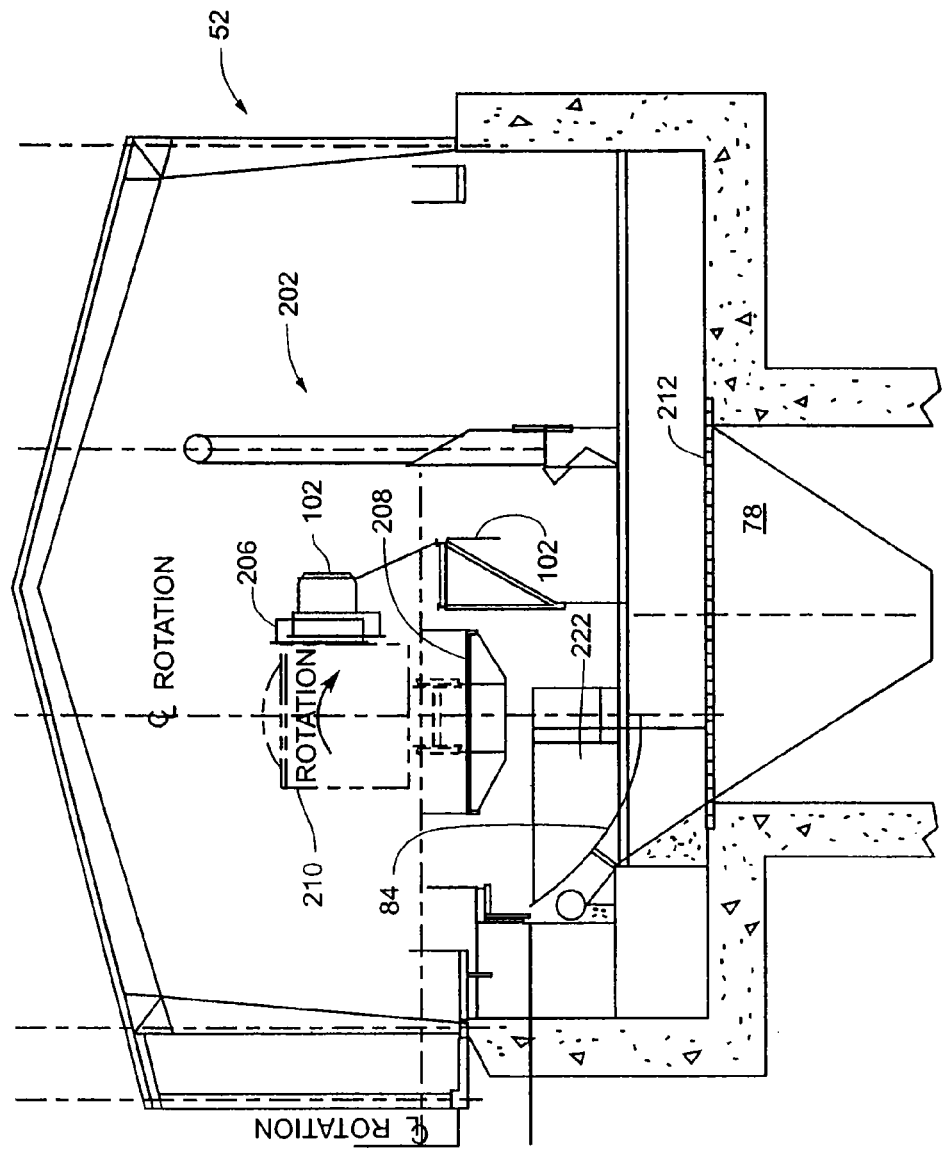
FIG. 28 is a sectional view of a rings in rotary dumper in accordance with the present invention.

Referring particularly to FIG. 27, end ring baffle 216 is secured and sealed to the edge of grizzly 212.

Referring now to FIGS. 28, 29a, 29b, and 29c, rings in dumper facility 202 generally includes car dumper 206, dumper platen 208, grizzly 212, railcar 210, and end of hood close off panel 222. End of hood close off panel 222 extends from platen support wall 224 to backside diverter 84 (also known as the ski jump). End of hood close off panel 222 thus creates a barrier to prevent dust laden air from escaping the containment area.

As baffles 102 rotate they first make contact with platen support wall 224 and then engages end of hood close off panel 222. This arrangement creates a continuous seal for the remainder of rotation of the car dumper 206, eliminating an escape path for dust laden air around the end of baffle 102.

In operation, a coal car 69 enters the rotary-dump facility 52 through entrance 130. The car 69 may be coupled to adjacent cars with a rotary coupling. The car to be dumped 69 is indexed on to track 76. The rotational frame 80 begins rotating the car 69 through a full dumping rotational motion of between 160 and 180 degrees, depending on facility design. As the car 69 is rotated, the material, such as coal, within the car 69 spills over the dump side of the car 69. The car 69 exits the facility 52 through an exit 131 after dumping is completed and the car 69 is returned to its upright position.

The dumping of the material generates a dust cloud. The cloud is retained in the pit 78 by sealing plates 96, 98 on the dump frame 80 and by the use of a plurality of baffles 102. The baffles 102 and facility 52 design features, such as diverters 82, 84 hood baffle 90 and intake hoods 74, 76 cause the dust cloud to tumble within the pit 78, thereby increasing the retention time of the dust cloud within the pit 78.

A plurality of intake hoods 74, 76 on both the dump side and back side of the frame 80 inhale the dust cloud and transmit the contaminated air through a transfer duct 56 to a remote filter facility 54. The dirty air enters a lower portion 57 of the facility 54 and is passed through a filter assembly before arriving at an upper portion 55 of the facility 54. The filter assembly traps the airborne contaminants in the lower portion 57 of the facility. The clean air continues through a filtered air exit duct 58, through a fan housing 62 and exits to the atmosphere though a clean air exhaust duct 60.

In operation, end ring baffle 216 extends above grizzly 212 and beyond perimeter of supporting ring 204. Thus, end ring baffle 216 seals off the space beneath supporting ring 204, thus, preventing dust laden air from exiting dumping facility 252. Thus dust laden air is retained in pit 78 until it can be removed by air flow.

End of hood close off panel 222 creates a barrier between platen support wall 224 and backside diverter 84 thus blocking off a path of escape for dust laden air. End of hood close off panel 222 seals dust laden air in pit 78 until it can be removed by air flow.

Although the present invention has been described with reference to the preferred embodiments, workers skilled in the art will recognize that changes may be made in form and detail without departing from the spirit and scope of the invention.

What is claimed is:

1. A method of modifying an apparatus for rotary dumping of rail cars to reduce dust pollution, wherein the apparatus may optionally already include a backside hood, the method comprising:

adding at least one baffle to a rotational frame disposed at least partially in a pit, the rotational frame configured to dump a load from a rail car during rotational motion of the rotational frame between an upright position wherein the entire load is in the rail car and a dumping position wherein the load can exit the rail car;

adding a backside airflow diverter within the pit adjacent a back side of the pit, wherein the backside airflow diverter includes a curved upper surface and a lower margin of the at least one baffle contacts the curved upper surface during at least part of the rotational motion of the rotational frame;

assessing the apparatus to determine whether the backside hood is already present;

adding the backside hood at a location beneath the backside airflow diverter on the back side of the pit if the backside hood is not already present.

2. The method of claim 1, further comprising positioning and sizing the at least one baffle on the rotational frame such that the at least one baffle is in contact with the curved upper surface of the backside airflow diverter when the rotational frame is rotated more than sixty degrees from a horizontal plane.

3. The method of claim 1, further comprising adding a dump side airflow diverter and locating the dump side airflow diverter at least partially disposed in the material receiving pit.

4. The method of claim 1, further comprising hingedly fastening the at least one baffle to the rotational frame.

5. The method of claim 4, further comprising positioning the curved upper surface of the backside airflow diverter to cause the at least one baffle to hingedly rotate in relation to the backside airflow diverter.

6. The method of claim 1, further comprising positioning a leading edge of the at least one baffle to scrape the curved upper surface during a return portion of the rotational motion.

7. The method of claim 1, further comprising coupling the backside hood in fluid communication with a filter facility.

8. A rotary rail car dumper, comprising:
a rotational frame supporting at least one baffle, the rotational frame configured to dump a load from a rail car during rotational motion of the rotational frame between an upright position wherein the entire load is in the rail car and a dumping position wherein the load can exit the rail car;
a backside airflow diverter beneath the rotational frame, wherein the backside airflow diverter includes a curved upper surface and a lower margin of the at least one baffle contacts the curved upper surface during at least part of the rotational motion of the rotational frame;
a backside hood located beneath the backside airflow diverter on the back side of the pit.

9. The rotary rail car dumper as claimed in claim 8, wherein the at least one baffle on the rotational frame is sized and positioned such that the at least one baffle is in contact with the curved upper surface of the backside airflow diverter when the rotational frame is rotated more than sixty degrees from a horizontal plane.

10. The rotary rail car dumper as claimed in claim 8, further comprising a dump side airflow diverter and located at least partially disposed in the material receiving pit.

11. The rotary rail car dumper as claimed in claim 8, further comprising a hinge fastening the at least one baffle to the rotational frame.

12. The rotary rail car dumper as claimed in claim 11, wherein the curved upper surface of the backside airflow diverter is positioned to cause the at least one baffle to hingedly rotate in relation to the backside airflow diverter.

13. The rotary rail car dumper as claimed in claim 8, further comprising a leading edge of the at least one baffle that is positioned to scrape the curved upper surface during a return portion of the rotational motion.

14. The rotary rail car dumper as claimed in claim 8, wherein the backside hood is coupled in fluid communication with a filter facility.

* * * * *